(12) United States Patent
Sato et al.

(10) Patent No.: US 11,796,854 B2
(45) Date of Patent: Oct. 24, 2023

(54) OPTICAL MEMBER AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/752,210

(22) Filed: May 24, 2022

(65) Prior Publication Data

US 2022/0283464 A1 Sep. 8, 2022

Related U.S. Application Data

(63) Continuation of application No. PCT/JP2020/043253, filed on Nov. 19, 2020.

(30) Foreign Application Priority Data

Nov. 26, 2019 (JP) ................................ 2019-213512

(51) Int. Cl.
*G02F 1/1335* (2006.01)
*G02F 1/13363* (2006.01)
(Continued)

(52) U.S. Cl.
CPC ..... *G02F 1/133524* (2013.01); *G02B 6/0026* (2013.01); *G02B 6/0056* (2013.01);
(Continued)

(58) Field of Classification Search
CPC ......... G02F 1/133524; G02F 1/133504; G02F 1/133541; G02F 1/133637;
(Continued)

(56) References Cited

U.S. PATENT DOCUMENTS

2001/0046142 A1* 11/2001 Van Santen .......... G02B 6/0038
362/559
2015/0247963 A1* 9/2015 Fujisawa ................ G02B 5/305
359/489.07
(Continued)

FOREIGN PATENT DOCUMENTS

WO WO2016/194961 A1 12/2016
WO WO-2018070094 A1 * 4/2018 ......... G02B 27/0081
(Continued)

OTHER PUBLICATIONS

English Machine Translation of WO 2018070094 (Year: 2023).*
(Continued)

*Primary Examiner* — Donald L Raleigh
(74) *Attorney, Agent, or Firm* — Birch, Stewart, Kolasch & Birch, LLP

(57) ABSTRACT

Provided are an optical member in which emission of stray light to the outside can be suppressed and an image display apparatus. The optical member includes: a light guide element including a light guide plate and an incidence diffraction element and an emission diffraction element that are disposed on a main surface of the light guide plate; and a polarization element that blocks transmission of light leaking to a side of the emission diffraction element opposite to an emission side, wherein the emission diffraction element is a polarization diffraction element, the polarization element is disposed on the side of the emission diffraction element opposite to the emission side, and the polarization element is disposed at a position overlapping the emission diffraction element in a plane direction of the main surface of the light guide plate.

21 Claims, 12 Drawing Sheets

(51) Int. Cl.
    *F21V 8/00* (2006.01)
    *G02B 27/01* (2006.01)
(52) U.S. Cl.
    CPC .. *G02F 1/133504* (2013.01); *G02F 1/133541* (2021.01); *G02F 1/133637* (2021.01); *G02F 1/133638* (2021.01); *G02B 27/0172* (2013.01)
(58) Field of Classification Search
    CPC ............ G02F 1/133638; G02B 6/0026; G02B 6/0056; G02B 27/0172; G02B 5/3033; G02B 5/18; G02B 5/30
    See application file for complete search history.

(56) References Cited

U.S. PATENT DOCUMENTS

| | | | |
|---|---|---|---|
| 2016/0231568 A1 | 8/2016 | Saarikko et al. | |
| 2017/0299864 A1 | 10/2017 | Vallius et al. | |
| 2018/0164480 A1 | 6/2018 | Yoshida | |
| 2019/0086674 A1* | 3/2019 | Sinay | G06T 19/006 |
| 2020/0081170 A1 | 3/2020 | Saitoh et al. | |
| 2021/0026049 A1 | 1/2021 | Saitoh et al. | |
| 2021/0088703 A1 | 3/2021 | Saitoh et al. | |

FOREIGN PATENT DOCUMENTS

| | | |
|---|---|---|
| WO | WO2018/212348 A1 | 11/2018 |
| WO | WO2019/060741 A1 | 3/2019 |
| WO | WO2019/189586 A1 | 10/2019 |
| WO | WO2019/221294 A1 | 11/2019 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/043253, dated Jun. 9, 2022, with an English translation.
International Search Report (Form PCT/ISA/210) for International Application No. PCT/JP2020/043253, dated Jan. 12, 2021, with an English translation.
Japanese Notice of Reasons for Refusal for corresponding Japanese Application No. 2021-561361, dated May 16, 2023, with an English translation.

* cited by examiner

OPTICAL MEMBER AND IMAGE DISPLAY APPARATUS

CROSS-REFERENCE TO RELATED APPLICATIONS

This application is a Continuation of PCT International Application No. PCT/JP2020/043253 filed on Nov. 19, 2020, which claims priority under 35 U.S.C. § 119(a) to Japanese Patent Application No. 2019-213512 filed on Nov. 26, 2019. The above application is hereby expressly incorporated by reference, in its entirety, into the present application.

BACKGROUND OF THE INVENTION

1. Field of the Invention

The present invention relates to an optical member in which light propagates and an image display apparatus including the optical member.

2. Description of the Related Art

Recently, as described in US2016/0231568A1, augmented reality (AR) glasses that display a virtual image and various information or the like to be superimposed on a scene that is actually being seen have been put into practice. The AR glasses are also called, for example, smart glasses or a head-mounted display (HMD).

As described in US2016/0231568A1, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using an incidence diffraction element to be incident into one end part of a light guide plate. As a result, the light is introduced into the light guide plate at an angle such that the light is totally reflected and propagates in the light guide plate. The light propagated in the light guide plate is also diffracted by an emission diffraction element in the other end part of the light guide plate and is emitted from the light guide plate to an observation position by the user.

SUMMARY OF THE INVENTION

In AR glasses including a light guide element that includes the light guide plate and the diffraction elements, in a case where light is emitted from a display to an observation position by a user, there is a problem in that stray light leaks in a direction opposite to the direction of the observation position and is recognized by a person other than the user.

An object of the present invention is to solve the above-described problem of the related art and to provide an optical member in which emission of stray light to the outside can be suppressed and an image display apparatus.

In order to achieve the object, the present invention has the following configurations.

[1] An optical member comprising:
a light guide element including a light guide plate and an incidence diffraction element and an emission diffraction element that are disposed on a main surface of the light guide plate; and
a polarization element that blocks transmission of light leaking to a side of the emission diffraction element opposite to an emission side,
in which the emission diffraction element is a polarization diffraction element,
the polarization element is disposed on the side of the emission diffraction element opposite to the emission side, and
the polarization element is disposed at a position overlapping the emission diffraction element in a plane direction of the main surface of the light guide plate.

[2] The optical member according to [1],
in which the emission diffraction element is a reflective diffraction element, and
the polarization element is disposed on a side of the emission diffraction element opposite to the light guide plate side.

[3] The optical member according to [1] or [2],
in which the polarization element is spaced from the light guide element.

[4] The optical member according to any one of [1] to [3],
in which the polarization element is an elliptical polarizing plate.

[5] The optical member according to any one of [1] to [4],
in which the polarization element is a circular polarization plate.

[6] The optical member according to any one of [1] to [5],
in which the polarization element consists of a linear polarizer and a retardation plate.

[7] The optical member according to [6],
in which the retardation plate is a $\lambda/4$ plate.

[8] The optical member according to [6] or [7],
in which the retardation plate has reverse wavelength dispersibility.

[9] The optical member according to any one of [1] to [8],
in which the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

[10] The optical member according to [9],
in which the liquid crystal diffraction element has a region in which the direction of the optical axis of the liquid crystal compound is helically twisted and rotates in a thickness direction.

[11] The optical member according to [9] or [10],
in which the liquid crystal diffraction element includes a cholesteric liquid crystal layer obtained by immobilizing a cholesteric liquid crystalline phase.

[12] The optical member according to any one of [1] to [11],
in which a period of a diffraction structure of the polarization diffraction element is 0.1 μm or more and 10 μm or less.

[13] An image display apparatus comprising:
the optical member according to any one of [1] to [12]; and
a display element that emits an image to the incidence diffraction element of the optical member.

According to an aspect of the present invention, it is possible to provide an optical member in which emission of stray light to the outside can be suppressed and an image display apparatus.

DESCRIPTION OF THE PREFERRED EMBODIMENTS

Hereinafter, an optical member and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

[Optical Member and Image Display Apparatus]

The optical member according to the embodiment of the present invention comprises:

a light guide element including a light guide plate and an incidence diffraction element and an emission diffraction element that are disposed on a main surface of the light guide plate; and a polarization element that blocks transmission of light leaking to a side of the emission diffraction element opposite to an emission side, in which the emission diffraction element is a polarization diffraction element, the polarization element is disposed on the side of the emission diffraction element opposite to the emission side, and the polarization element is disposed at a position overlapping the emission diffraction element in a plane direction of the main surface of the light guide plate.

The image display apparatus according to the embodiment of the present invention comprises:

the above-described optical member; and a display element that emits an image to the incidence diffraction element of the optical member.

Figure 1:
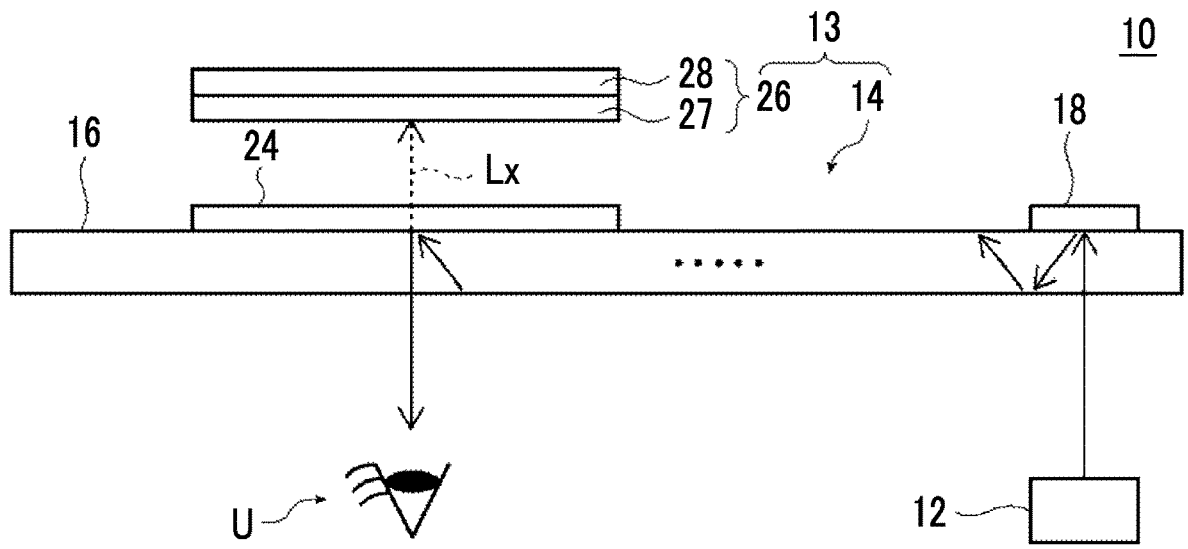
FIG. 1 is a top view conceptually showing an example of an image display apparatus including an optical member according to the present invention.

FIG. 1 conceptually shows an example of the image display apparatus according to the embodiment of the present invention including the optical member according to the embodiment of the present invention.

The image display apparatus 10 shown in FIG. 1 is used as AR glasses as a preferable example. The optical member according to the embodiment of the present invention can also be used not only as AR glasses but also as an optical element such as a transparent screen, a lighting device (including a backlight unit or the like of a liquid crystal display), or a sensor. In addition, the image display apparatus according to the embodiment of the present invention can also be used as an image display apparatus including the optical element.

An image display apparatus 10 shown in FIG. 1 includes: a display element 12; a light guide element 14 including a light guide plate 16 and an incidence diffraction element 18 and an emission diffraction element 24 that are disposed on a main surface of the light guide plate 16; and an optical member 13 including a polarization element 26.

In the image display apparatus 10 shown in FIG. 1, the incidence diffraction element 18 and the emission diffraction element 24 are disposed at different positions in a plane direction of the main surface of the light guide plate 16. In the example shown in FIG. 1, the emission diffraction element 24 is disposed on the left side of the incidence diffraction element 18. The main surface is the maximum surface of a sheet-shaped material (a plate-shaped material, a film, or the like).

In addition, the display element 12 is disposed at a position overlapping the incidence diffraction element 18 in the plane direction of the main surface of the light guide plate 16 to face a surface of the light guide plate 16 opposite to the side where the incidence diffraction element 18 is disposed.

In the example shown in FIG. 1, the incidence diffraction element 18 and the emission diffraction element 24 are reflective diffraction elements that reflect and diffract light. In addition, the emission diffraction element 24 is a polarization diffraction element that selectively diffracts light in a predetermined polarized state.

In the image display apparatus 10, an image (light corresponding to the image) displayed by the display element 12 is incident into the incidence diffraction element 18 from a direction perpendicular to the main surface of the light guide plate 16. The light incident into the incidence diffraction element 18 is diffracted by the incidence diffraction element 18 to be incident into the light guide plate 16. In this case, the incidence diffraction element 18 diffracts the light at an angle at which total reflection occurs in the light guide plate 16, and diffracts the light such that a traveling direction of the diffracted light is a direction toward the emission diffraction element 24. In the example shown in FIG. 1, the incidence diffraction element 18 diffracts the incident light in the left direction in FIG. 1.

The diffracted light by the incidence diffraction element 18 is totally reflected and propagates in the light guide plate 16 such that the diffracted light is incident into the emission diffraction element 24. The emission diffraction element 24 diffracts the incident light to deviate from the angle at which total reflection occurs in the light guide plate 16. In the example shown in FIG. 1, the emission diffraction element 24 diffracts the incident light to the lower side in FIG. 1. That is, as shown in FIG. 1, the emission diffraction element 24 diffracts the incident light in a direction substantially perpendicular to the main surface of the light guide plate.

The light diffracted by the emission diffraction element 24 is emitted from the light guide plate 16 to a user U. As a result, the image display apparatus 10 can display the image emitted from the display element 12.

Here, the optical member 13 includes the polarization element 26. In the example shown in FIG. 1, the polarization element 26 is disposed on a side of the emission diffraction element 24 opposite to the light guide plate 16 side. That is, the polarization element 26 is disposed on the side of the emission diffraction element 24 opposite to the emission side. In addition, the polarization element 26 is disposed at a position overlapping the emission diffraction element 24 in the plane direction of the main surface of the light guide plate 16.

In the example shown in FIG. 1, the polarization element 26 consists of a retardation layer 27 and a linear polarizer 28.

As described above, in a case where an image emitted from a display element is guided using a light guide element including a light guide plate and a diffraction element and is emitted using an emission diffraction element, there is a problem in that light (stray light $L_x$) leaks to a side opposite to the emission side by the emission diffraction element. In a case where light is leaks to the side opposite to the emission side, the image is recognized by a person other than the user.

According to an investigation by the present inventors, it was found that the stray light is light in a polarized state that is selectively diffracted by the emission diffraction element. That is, the stray light is a part of the light that should be guided in the light guide plate and diffracted to the emission side by the emission diffraction element.

On the other hand, the optical member according to the embodiment of the present invention includes the polarization element that is disposed on the side of the emission diffraction element opposite to the emission side and is disposed at a position overlapping the emission diffraction element in the plane direction of the main surface of the light guide plate.

The polarization element absorbs or reflects the light in the polarized state that is selectively diffracted by the emission diffraction element. By disposing the polarization element on the side of the emission diffraction element opposite to the emission side and disposing at the position overlapping the emission diffraction element in the plane direction of the main surface of the light guide plate, transmission of light leaking to a side of the emission diffraction element opposite to an emission side can be blocked. As a result, emission of stray light to the outside can be suppressed. In addition, the recognition of the image by a person other than the user due to stray light can be suppressed. It is preferable that the polarization element absorbs the light in the polarized state that is selectively diffracted by the emission diffraction element.

For example, in a case where the light that is selectively diffracted by the emission diffraction element is right circularly polarized light, a left circular polarization plate that allows transmission of left circularly polarized light and absorbs (or reflects) right circularly polarized light is used as the polarization element. By disposing the left circular polarization plate on the side of the emission diffraction element opposite to the emission side and disposing at the position overlapping the emission diffraction element in the plane direction of the main surface of the light guide plate, right circularly polarized light leaking to the side of the emission diffraction element opposite to the emission side is absorbed (or reflected) such that transmission thereof can be blocked.

In addition, the polarization element absorbs or reflects the light in the predetermined polarized state and allows transmission of light in the other polarized states. Therefore, a part of light of scenery of the back surface side (side opposite to the emission side) of the optical member transmits through the polarization element and reaches the user side. Accordingly, the user recognizes the scenery and the image emitted from the display element in a state where they are superimposed.

In a case where the emission diffraction element selectively diffracts circularly polarized light, a circular polarization plate may be used as the polarization element. In addition, in a case where the emission diffraction element selectively diffracts elliptically polarized light, an elliptical polarizing plate may be used. In addition, in a case where the emission diffraction element selectively diffracts linearly polarized light, a linear polarizing plate may be used.

In addition, for example, even in a case where the emission diffraction element selectively reflects circularly polarized light, the polarized state may collapse to obtain elliptically polarized light while the circularly polarized light is guided in the light guide plate. Therefore, in a case where the emission diffraction element selectively diffracts circularly polarized light, an elliptical polarizing plate may be used.

In addition, in a view from a direction perpendicular to the main surface of the light guide plate, the polarization element may be disposed to overlap at least a part of the emission diffraction element. However, it is preferable that the polarization element is disposed to cover the entire surface of the emission diffraction element as shown in FIG. 1.

Here, in the example shown in FIG. 1, the polarization element 26 is disposed to be spaced from the light guide element 14. However, the present invention is not limited to this configuration, and the polarization element 26 may be in contact with the light guide element 14. From the viewpoint of the brightness of the displayed image, it is preferable that the polarization element 26 is disposed to be spaced from the light guide element 14.

In general, the refractive index of the polarization element 26 is higher than that of air and is close to the refractive index of the light guide element 14. Therefore, in a case where the polarization element 26 and the light guide element 14 are in contact with each other, a part of the light guided in the light guide plate 16 reaches an interface with the polarization element 26 directly before being incident into the emission diffraction element 24 or without being diffracted even after being incident into the emission diffraction element 24. In this case, the light is incident into the polarization element 26 and absorbed without being totally reflected from the interface with the polarization element 26. Therefore, the amount of light diffracted and emitted by the emission diffraction element 24 decreases, and the brightness of the displayed image decreases. On the other hand, in a case where the polarization element 26 and the light guide element 14 are spaced from each other, light that is not diffracted by the emission diffraction element 24 reaches an interface with air. In this case, the light is totally reflected from the interface with air, is guided in the light guide plate 16, and is diffracted by the emission diffraction element 24. Therefore, the amount of light diffracted and emitted by the emission diffraction element 24 increases, and the brightness of the displayed image increases.

Here, in the example shown in FIG. 1, the light guide element of the optical member includes the incidence diffraction element and the emission diffraction element. However, the present invention is not limited thereto, and an intermediate diffraction element may be further provided.

Figure 2:
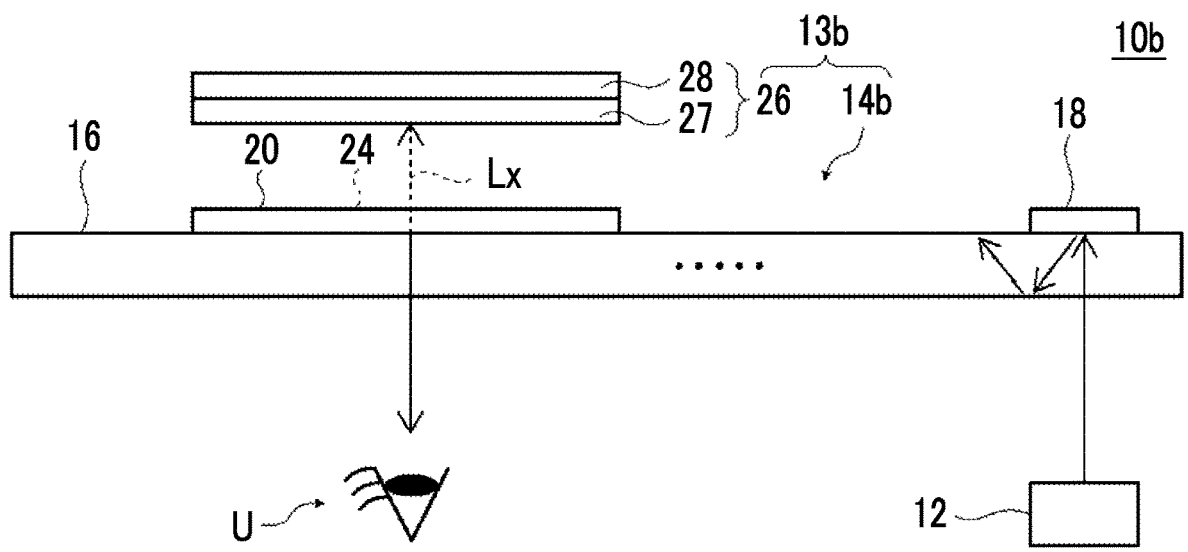
FIG. 2 is a top view conceptually showing another example of the image display apparatus including the optical member according to the present invention.
Figure 3:
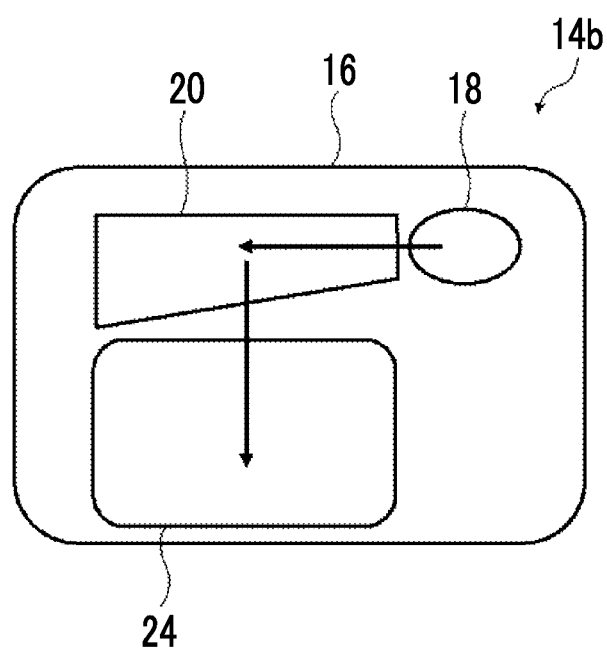
FIG. 3 is a front view conceptually showing the image display apparatus shown in FIG. 2.
Figure 4:
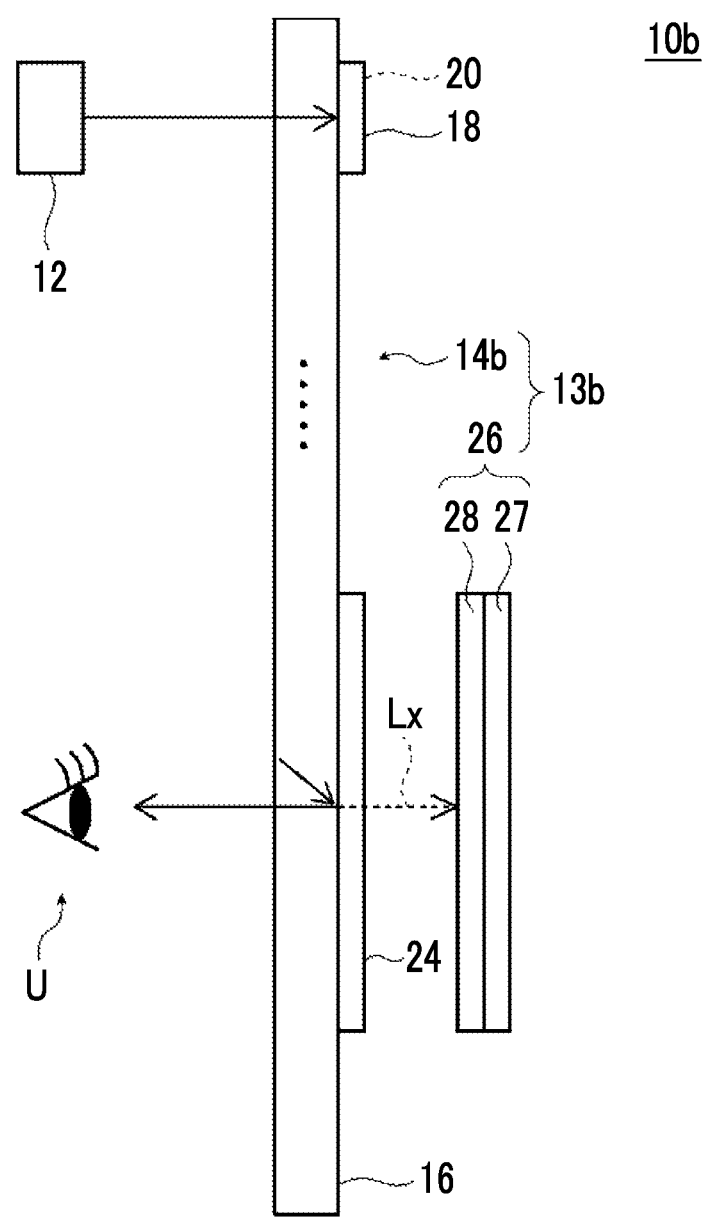
FIG. 4 is a side view conceptually showing the image display apparatus shown in FIG. 2.

FIGS. 2 to 4 conceptually shows another example of the image display apparatus according to the embodiment of the present invention including the optical member according to the embodiment of the present invention. FIG. 2 is a top view showing an image display apparatus 10*b* in case of being seen from an upper direction on the paper plane of FIG. 3. FIG. 3 is a front view showing the image display apparatus 10*b* in case of being seen from a surface on a viewing side by the user U. FIG. 4 is a side view showing the image display apparatus 10*b* in case of being seen from the right side on the paper plane of FIG. 3.

The image display apparatus 10*b* shown in FIGS. 2 to 4 includes: the display element 12; a light guide element 14*b* including the light guide plate 16 and the incidence diffraction element 18, an intermediate diffraction element 20, and the emission diffraction element 24 that are disposed on the main surface of the light guide plate 16; and an optical member 13*b* including the polarization element 26. FIG. 3 does not show the display element 12.

In the image display apparatus 10*b* shown in FIGS. 2 to 4, the incidence diffraction element 18, the intermediate diffraction element 20, and the emission diffraction element 24 are disposed at different positions in the plane direction of the main surface of the light guide plate 16. In the example shown in FIG. 3, the intermediate diffraction element 20 is disposed on the left side of the incidence diffraction element 18 in FIG. 3, and the emission diffraction element 24 is disposed on the lower side of the intermediate diffraction element 20 in FIG. 3.

In addition, the display element 12 is disposed at a position overlapping the incidence diffraction element 18 in the plane direction of the main surface of the light guide plate 16 to face the surface of the light guide plate 16 opposite to the side where the incidence diffraction element 18 is disposed.

In the image display apparatus 10*b*, an image displayed by the display element 12 is incident into the incidence diffraction element 18 from a direction perpendicular to the main surface of the light guide plate 16. The light incident into the incidence diffraction element 18 is diffracted by the incidence diffraction element 18 to be incident into the light guide plate 16. In this case, the incidence diffraction element 18 diffracts the light at an angle at which total reflection occurs in the light guide plate 16, and diffracts the light such that a traveling direction of the diffracted light is a direction toward the intermediate diffraction element 20. In the example shown in FIG. 3, the incidence diffraction element 18 diffracts the incident light in the left direction in FIG. 3.

The diffracted light by the incidence diffraction element 18 is totally reflected and propagates in the light guide plate 16 such that the diffracted light is incident into the intermediate diffraction element 20. The intermediate diffraction element 20 diffracts the incident light such that the traveling direction of the light is directed to the emission diffraction element 24. In the example shown in FIG. 3, the intermediate diffraction element 20 diffracts the incident light in the lower direction in FIG. 3.

The light diffracted by the intermediate diffraction element 20 is totally reflected and propagates in the light guide plate 16 to be incident into emission diffraction element 24. The emission diffraction element 24 diffracts the incident light to deviate from the angle at which total reflection occurs in the light guide plate 16. In the example shown in FIG. 3, the emission diffraction element 24 diffracts the incident light in a direction perpendicular to the paper plane of FIG. 3. That is, as shown in FIG. 2, the emission diffraction element 24 diffracts the incident light in a direction substantially perpendicular to the main surface of the light guide plate.

The light diffracted by the emission diffraction element 24 is emitted from the light guide plate 16 to the user U. As a result, the image display apparatus 10*b* can display the image emitted from the display element 12.

Here, the light guide element 14*b* includes the intermediate diffraction element 20. Therefore, in a case where light is diffracted by the intermediate diffraction element 20, a part of the light is diffracted at a plurality of positions of the intermediate diffraction element such that exit pupil can be expanded.

Here, the optical member 13*b* includes the polarization element 26 as in the optical member 13 shown in FIG. 1. In the example shown in FIG. 2, the polarization element 26 is disposed on a side of the emission diffraction element 24 opposite to the light guide plate 16 side. That is, the polarization element 26 is disposed on the side of the emission diffraction element 24 opposite to the emission side. In addition, the polarization element 26 is disposed at a position overlapping the emission diffraction element 24 in the plane direction of the main surface of the light guide plate 16.

As a result, transmission of the light $L_x$ leaking to the side of the emission diffraction element 24 opposite to the emission side can be blocked, and emission of the stray light $L_x$ to the outside can be suppressed. In addition, the recognition of the image by a person other than the user due to stray light can be suppressed.

Here, in the example shown in FIG. 1, a reflective diffraction element is used as the emission diffraction element 24 and the incidence diffraction element 18. However, the present invention is not limited thereto, and a transmission type diffraction element may be provided.

Figure 5:
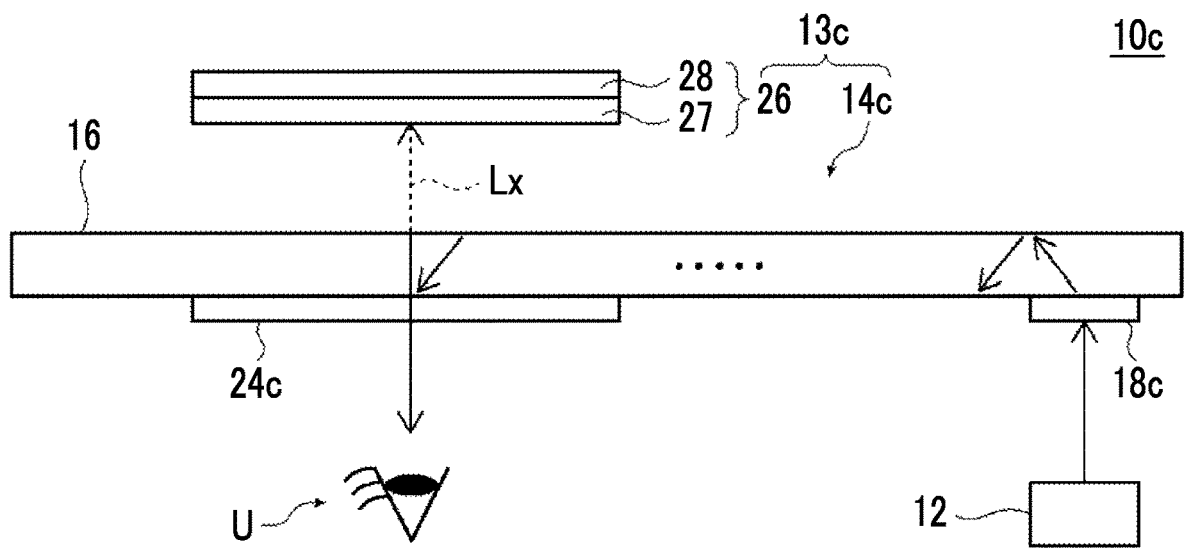
FIG. 5 is a top view conceptually showing another example of the image display apparatus including the optical member according to the present invention.

FIG. 5 conceptually showing another example of the image display apparatus including the optical member according to the embodiment of the present invention.

An image display apparatus 10*c* shown in FIG. 5 includes: a display element 12; a light guide element 14*c* including the light guide plate 16 and an incidence diffraction element 18*c* and an emission diffraction element 24c that are disposed on a main surface of the light guide plate 16; and an optical member 13c including a polarization element 26.

In the image display apparatus 10c shown in FIG. 5, the incidence diffraction element 18c and the emission diffraction element 24c are disposed at different positions in the plane direction of the main surface of the light guide plate 16. In the example shown in FIG. 5, the emission diffraction element 24c is disposed on the left side of the incidence diffraction element 18c.

In addition, the display element 12 is disposed at a position overlapping the incidence diffraction element 18 in the plane direction of the main surface of the light guide plate 16 to face the incidence diffraction element 18.

In the example shown in FIG. 5, the incidence diffraction element 18c and the emission diffraction element 24c are transmission type diffraction elements that diffract light while allowing transmission of the light. In addition, the emission diffraction element 24c is a polarization diffraction element that selectively diffracts light in a predetermined polarized state.

In the image display apparatus 10c, an image displayed by the display element 12 is incident into the incidence diffraction element 18 from a direction perpendicular to the main surface of the light guide plate 16. The incidence diffraction element 18c diffracts the incident light to be incident into the light guide plate 16. In this case, the incidence diffraction element 18c diffracts the light at an angle at which total reflection occurs in the light guide plate 16, and diffracts the light such that a traveling direction of the diffracted light is a direction toward the emission diffraction element 24c. In the example shown in FIG. 5, the incidence diffraction element 18c diffracts the incident light in the left direction in FIG. 5.

The diffracted light by the incidence diffraction element 18c is totally reflected and propagates in the light guide plate 16 such that the diffracted light is incident into the emission diffraction element 24c. The emission diffraction element 24c diffracts the incident light to deviate from the angle at which total reflection occurs in the light guide plate 16. In the example shown in FIG. 5, the emission diffraction element 24c diffracts the incident light to the lower side in FIG. 5. That is, as shown in FIG. 5, the emission diffraction element 24c diffracts the incident light in a direction substantially perpendicular to the main surface of the light guide plate.

The light diffracted by the emission diffraction element 24c is emitted from the light guide plate 16 to the user U. As a result, the image display apparatus 10c can display the image emitted from the display element 12.

Here, the optical member 13c includes the polarization element 26. In the example shown in FIG. 5, the polarization element 26 is disposed on a side of the light guide plate 16 opposite to the emission diffraction element 24c side. That is, the polarization element 26 is disposed on the side of the emission diffraction element 24c opposite to the emission side. In addition, the polarization element 26 is disposed at a position overlapping the emission diffraction element 24c in the plane direction of the main surface of the light guide plate 16.

As a result, transmission of the light $L_x$ leaking to the side of the emission diffraction element 24c opposite to the emission side can be blocked, and emission of the stray light $L_x$ to the outside can be suppressed. In addition, the recognition of the image by a person other than the user due to stray light can be suppressed.

Here, the incidence diffraction element, the intermediate diffraction element, and the emission diffraction element may be configured to include a liquid crystal layer having wavelength selectivity described below. That is, the incidence diffraction element, the intermediate diffraction element, and the emission diffraction element may have wavelength selectivity. In this case, each of the diffraction elements may be configured to include one liquid crystal layer having wavelength selectivity or to include two or more liquid crystal layers having wavelength selectivity.

For example, the diffraction element may include two liquid crystal layers including a liquid crystal layer that selectively reflects red light and a liquid crystal layer that selectively reflects green light, and may include three liquid crystal layers including a liquid crystal layer that selectively reflects red light, a liquid crystal layer that selectively reflects green light, and a liquid crystal layer that selectively reflects blue light.

In a configuration where the diffraction element includes a plurality of liquid crystal layers, for example, the liquid crystal layers reflect three color components including red light, green light, and blue light, respectively, such that the light guide element can display a color image.

For example, the diffraction element also may be configured to include three liquid crystal layers having different selective reflection center wavelengths and to reflect not only light of one color or two or more colors selected from visible light such as red light, green light, or blue light but also infrared light and/or ultraviolet light or to reflect only light other than visible light.

Alternatively, the diffraction element may include two or four more liquid crystal layers having different selective reflection center wavelengths. In addition, the diffraction element may be configured to reflect light other than visible light such as infrared light and/or ultraviolet light in addition to visible light such as red light, green light, and blue light. Alternatively, each of the liquid crystal layers may be configured to reflect light other than visible light such as infrared light and/or ultraviolet light.

In addition, in the image display apparatus, the optical member according to the embodiment of the present invention may adopt a configuration including two or more light guide elements.

Figure 6:
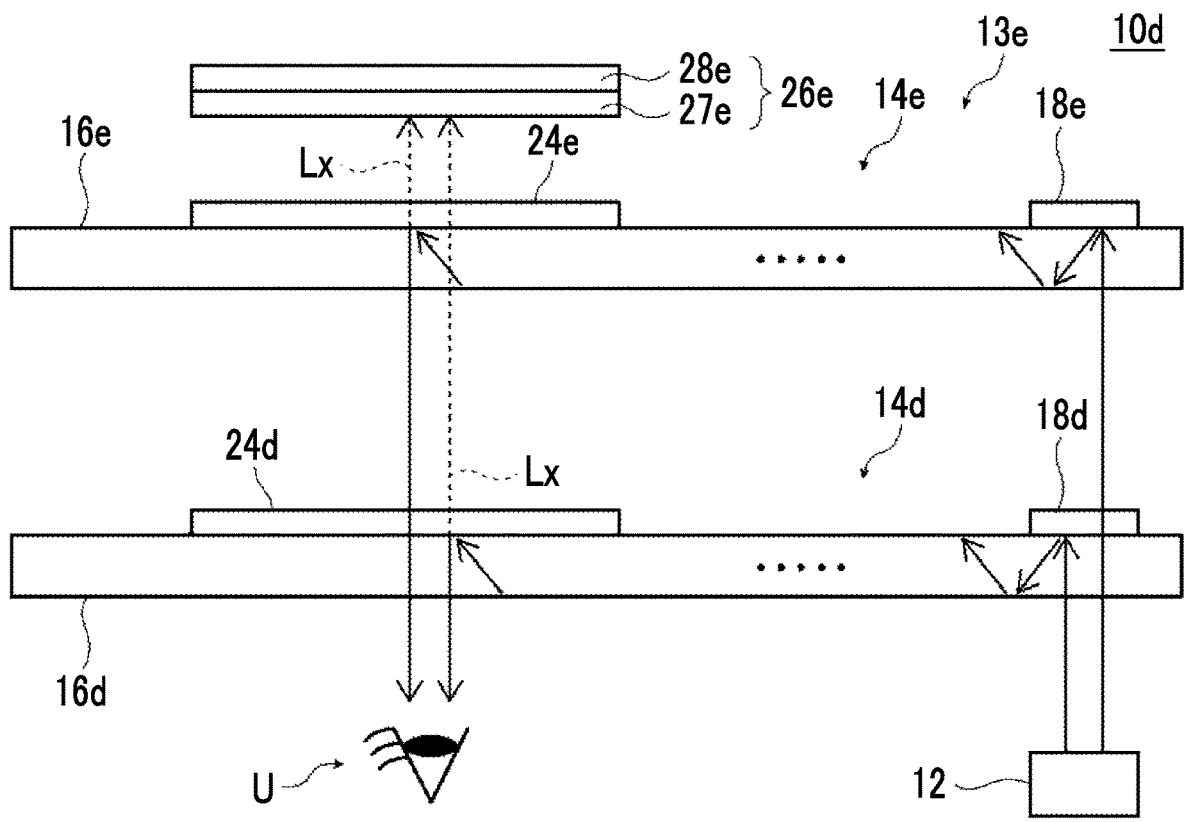
FIG. 6 is a top view conceptually showing another example of the image display apparatus according to the present invention.

For example, FIG. 6 conceptually shows an image display apparatus 10d having a configuration in which an optical member 13e includes two light guide elements 14d and 14e. In this configuration, for example, the optical member 13e includes, in the following order: a light guide element 14d including a light guide plate 16d and an incidence diffraction element 18d and an emission diffraction element 24d that are disposed on a main surface of the light guide plate 16d; a light guide element 14e including a light guide plate 16e and an incidence diffraction element 18e and an emission diffraction element 24e that are disposed on a main surface of the light guide plate 16e; and a polarization element 26e. The light guide element 14d and the light guide element 14e are disposed such that light emission surface sides thereof face the same direction. In addition, the polarization element 26e is disposed on the side of the light guide element opposite to the emission side.

For example, in the image display apparatus 10d, the light guide element 14d includes a diffraction element that reflects green light, and the light guide element 14e includes a diffraction element that reflects blue light. With this configuration, the image display apparatus 10d can guide each of green light and blue light. In this case, the stray light $L_x$ that leaks to the side opposite to the emission side due to the emission diffraction element of each of the light guide element 14*d* and the light guide element 14*e* is absorbed (or reflected) by the polarization element 26*e*. As a result, emission of stray light to the outside can be suppressed.

In addition, in the example shown in FIG. 6, the configuration in which two optical members that guide green light and blue light, respectively, are provided is shown. However, a configuration in which three or more optical members are provided may be adopted. For example, a configuration in which three optical members that guide red light, green light, and blue light, respectively, may be adopted.

Alternatively, a configuration in which a plurality of optical members are provided and at least one of the optical members guides two or more color light components may be adopted. For example, a configuration may be adopted in which two optical members are provided, one of the optical members guide two color light components selected from red light, green light, and blue light, and the other optical member guides the remaining one color light.

In addition, the optical member may be configured to guide light (infrared light or ultraviolet light) other than visible light.

In addition, although not shown in the drawing, each of the incidence diffraction element, the intermediate diffraction element, and the emission diffraction element is bonded to the light guide plate using a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the incidence diffraction element, the intermediate diffraction element, the emission diffraction element, and the light guide plate may be laminated and held by a frame, a jig, or the like to configure the light guide element according to the embodiment of the present invention.

Further, the incidence diffraction element, the intermediate diffraction element, and the emission diffraction element may be directly formed on the light guide plate.

Hereinafter, each of the components will be described.

[Display Element]

The display element 12 displays an image (video) to be observed by the user U and emits the image to the incidence diffraction element. Accordingly, the display elements 12 are disposed such that the emitted image is incident into the incidence diffraction elements.

In the image display apparatus according to the embodiment of the present invention, as the display element 12, various well-known display elements (a display device or a projector) used for AR glasses or the like can be used without any particular limitation. Examples of the display element 12 include a display element including a display and a projection lens.

In the image display apparatus according to the embodiment of the present invention, the display is not particularly limited. For example, various well-known displays used in AR glasses or the like can be used.

Examples of the display include a liquid crystal display (including Liquid Crystal On Silicon (LCOS)), an organic electroluminescent display, and a scanning type display employing a digital light processing (DLP) or Micro Electro Mechanical Systems (MEMS) mirror.

In a case where the image display apparatus displays a polychromic image, a display that displays a polychromic image is used.

For example, as shown in FIG. 6, in a case where the image display apparatus includes a plurality of optical members, a display that displays a polychromic image using light components having wavelengths diffracted by the diffraction elements of the optical members is used.

In the display element 12 used in the image display apparatus according to the embodiment of the present invention, the projection lens is also a well-known projection lens (collimating lens) used for AR glasses or the like.

Here, in the image display apparatus according to the embodiment of the present invention, a display image by the display element 12, that is, light to be emitted from the display element 12 is not limited and is preferably unpolarized light (natural light) or circularly polarized light.

In a case where the display element 12 emits circularly polarized light and the display emits an unpolarized light image, and it is preferable that the display element 12 includes, for example, a circular polarization plate consisting of a linear polarizer and an λ/4 plate. In addition, in a case where the display emits a linearly polarized light image, it is preferable that the display element 12 includes, for example, a λ/4 plate.

The light to be emitted by the display element 12 may be another polarized light (for example, linearly polarized light).

[Light Guide Plate]

In the light guide element 14, the light guide plate 16 is a well-known light guide plate that reflects light incident thereinto and guides (propagates) the reflected light.

As the light guide plate 16, various well-known light guide plates used for a backlight unit or the like of AR glasses or a liquid crystal display can be used without any particular limitation.

[Diffraction Element]

As the incidence diffraction element, the intermediate diffraction element, and the emission diffraction element, a polarization diffraction element can be used. In the following description, in a case where these diffraction elements do not need to be distinguished from each other, they will also collectively referred to as "diffraction element". In addition, as the incidence diffraction element and the intermediate diffraction element, a well-known diffraction element other than a polarization diffraction element can also be used.

[Polarization Diffraction Element]

As the polarization diffraction element, a well-known polarization diffraction element can be used. The polarization diffraction element is a diffraction element that controls a diffraction direction or a polarized state of emitted light and a diffracted light intensity depending on the polarized state of incident light by controlling the polarized state in a fine region. Examples of the polarization diffraction element include a polarization diffraction element in which a diffraction structure is formed using structural birefringence described in "Erez Hasman et al., Polarization dependent focusing lens by use of quantized Pancharatnm-Berry phase diffractive optics, Applied Physics Letters, Volume 82, Number 3, pp. 328-330" and a polarization diffraction element in which a diffraction structure is formed using a birefringence material described in JP5276847B.

Examples of the polarization diffraction element include a liquid crystal diffraction element that is formed using a composition including a liquid crystal compound and has a liquid crystal alignment pattern in which a direction of an optical axis derived from the liquid crystal compound changes while continuously rotating in at least one in-plane direction. In addition, it is also preferable that the liquid crystal diffraction element includes a cholesteric liquid crystal layer obtained by immobilizing a cholesteric liquid crystalline phase.

(Liquid Crystal Diffraction Element A)

An example of the liquid crystal diffraction element will be described using FIGS. 7 to 9.

Figure 7:
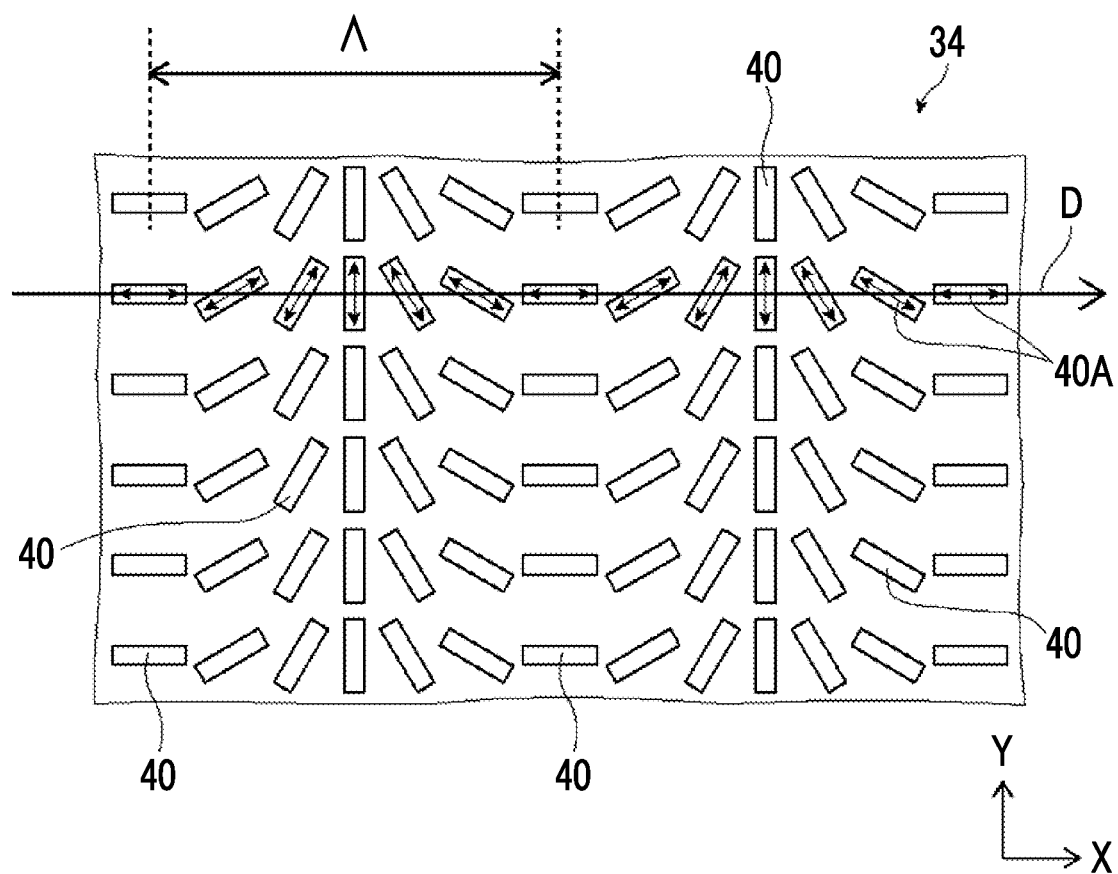
FIG. 7 is a plan view conceptually showing a liquid crystal layer used as a diffraction element.

FIG. 7 is a schematic diagram showing an alignment state of a liquid crystal compound in a plane of a main surface of a liquid crystal layer 34 including the liquid crystal diffraction element. In addition, FIG. 8 is a schematic cross-sectional view showing a state of a liquid crystal phase in a cross-section perpendicular to the main surface. In the following description, it is assumed that a main surface of the liquid crystal layer 34 is an X-Y plane and a cross-section perpendicular to the X-Y plane is a X-Z plane. That is, FIG. 7 corresponds to a schematic diagram of the X-Y plane of the liquid crystal layer 34, and FIG. 8 corresponds to a schematic diagram of the X-Z plane of the liquid crystal layer 34.

Figure 8:
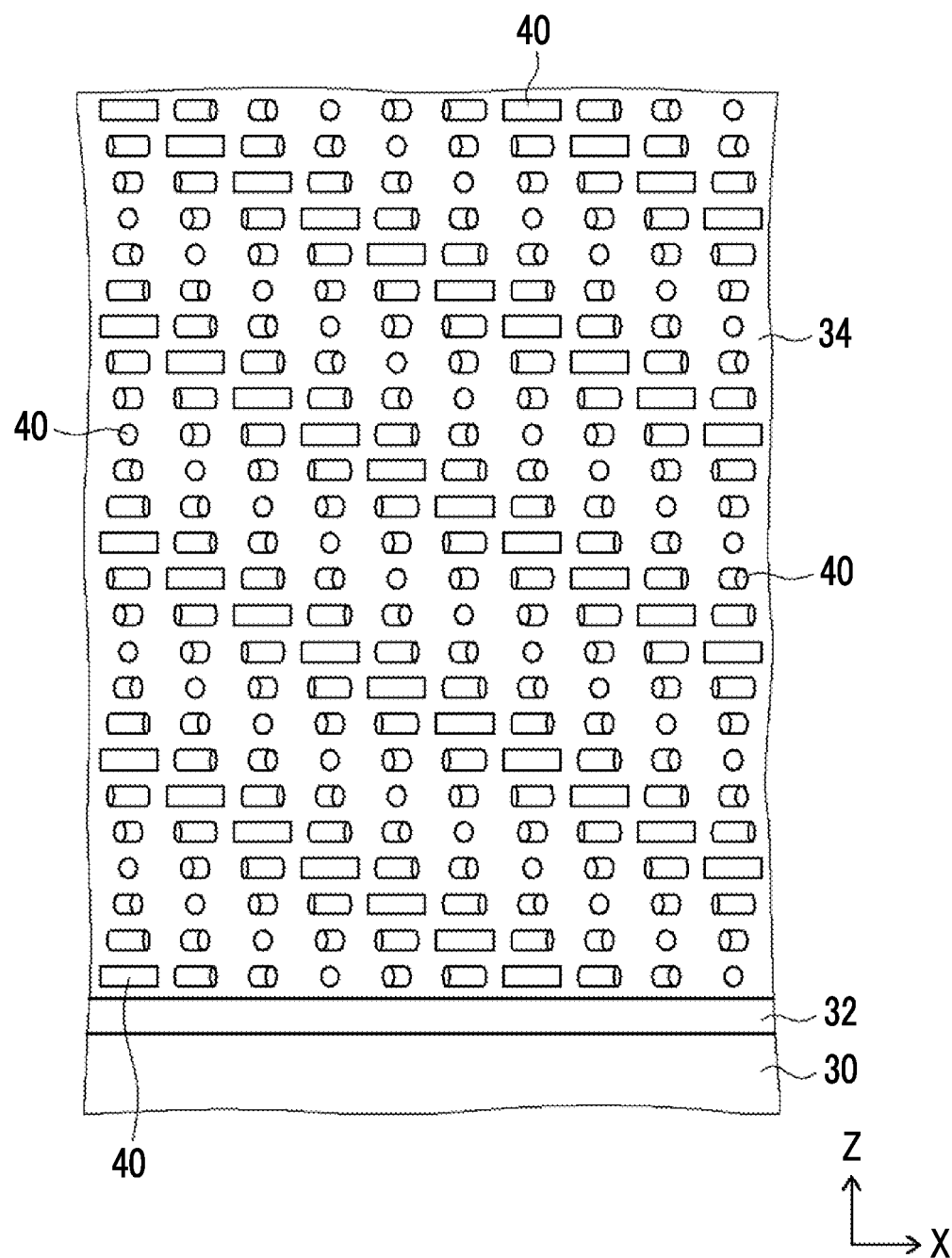
FIG. 8 is a conceptual diagram showing the liquid crystal layer shown in FIG. 7.

The liquid crystal layer shown in FIGS. 7 and 8 is an example of a cholesteric liquid crystal layer obtained by cholesteric alignment of a liquid crystal compound. In addition, the liquid crystal compound is an example of a rod-like liquid crystal compound. The cholesteric liquid crystal layer reflects one circularly polarized light having a selective reflection wavelength, and allows transmission of light in other wavelength ranges and other circularly polarized light. Accordingly, the liquid crystal diffraction element including the cholesteric liquid crystal layer is a reflective liquid crystal diffraction element.

In the example shown in FIG. 8, the liquid crystal diffraction element includes the support 30, the alignment film 32, and the liquid crystal layer 34.

In the example shown in FIG. 8, the liquid crystal diffraction element includes the support 30, the alignment film 32, and the liquid crystal layer 34. However, the present invention is not limited to this configuration. The liquid crystal diffraction element may include only the alignment film 32 and the liquid crystal layer 34 by peeling off the support 30 after bonding the laminate to the light guide plate 16. Alternatively, the liquid crystal diffraction element may include only the liquid crystal layer 34 by peeling off the support 30 and the alignment film 32 after bonding the laminate to the light guide plate 16.

<Support>

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, in the present invention, the liquid crystal layer 34 has a liquid crystal alignment pattern in which a direction of an optical axis 40A (refer to FIG. 7) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the liquid crystal diffraction element, for example, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-

94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 13:
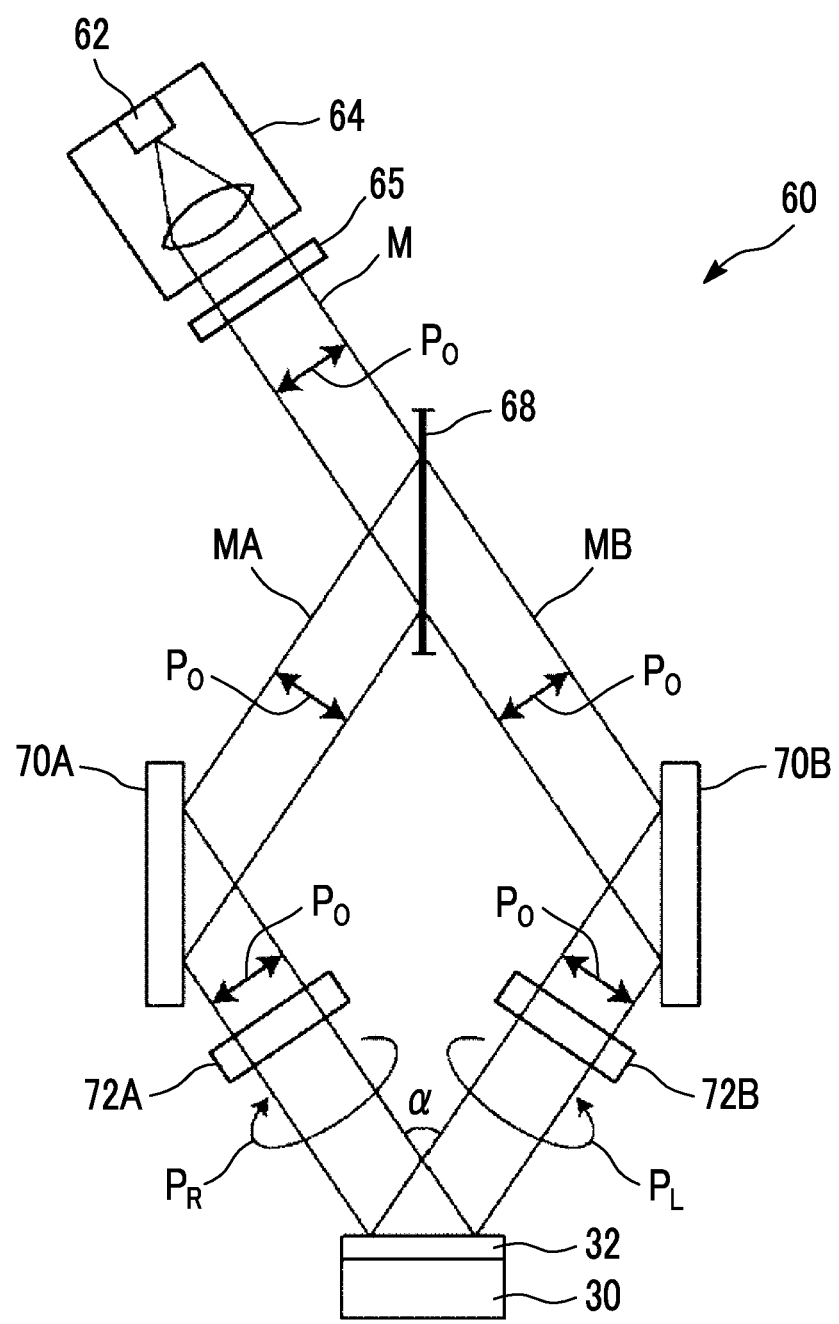
FIG. 13 is a conceptual diagram showing an example of an exposure device that exposes an alignment film.

FIG. 13 conceptually shows an example of an exposure device that exposes the alignment film 32 to form an alignment pattern.

An exposure device 60 shown in FIG. 13 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarized state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern to obtain the liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<Liquid Crystal Layer>

In the liquid crystal diffraction element, the liquid crystal layer 34 is formed on a surface of the alignment film 32.

As described above, the liquid crystal layer is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 8, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Although described below in detail, the selective reflection wavelength range of the cholesteric liquid crystal layer depends on the length (pitch P shown in FIG. 9) of one helical pitch described above.

Accordingly, the diffraction element including the liquid crystal layer has wavelength selectivity and diffracts light having a predetermined wavelength. Accordingly, regarding the wavelength of light that is reflected (diffracted) by the diffraction element, the selective reflection wavelength range of the liquid crystal layer may be appropriately set by adjusting the helical pitch P of the liquid crystal layer.

As shown in FIG. 7, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 7, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 7, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating.

On the other hand, in the liquid crystal compound 40 forming the liquid crystal layer 34, the directions of the optical axes 40A are the same in the direction (in FIG. 7, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D direction are the same in the Y direction.

Figure 9:
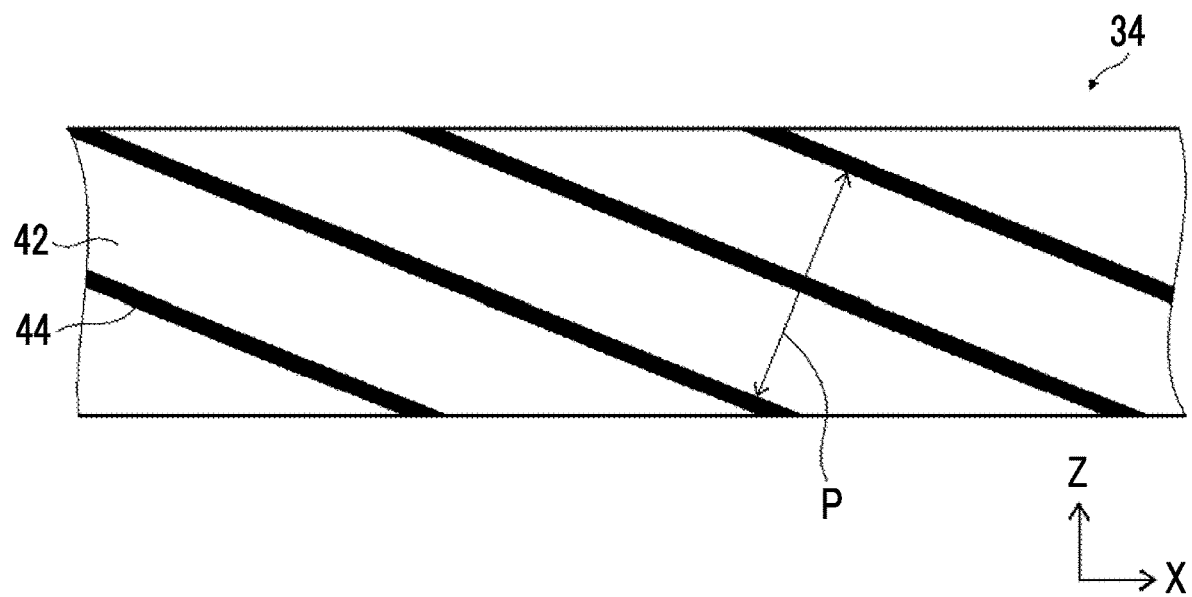
FIG. 9 is a diagram conceptually showing a cross-sectional SEM image of the liquid crystal layer shown in FIG. 7.

In a case where the X-Z plane of the liquid crystal layer 34 shown in FIG. 8 is observed with a scanning electron microscope (SEM), an arrangement direction in which bright portions 42 and dark portions 44 are alternately arranged as shown in FIG. 9, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 9, two bright portions 42 and two dark portions 44 correspond to one helical pitch (one helical turn).

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 10:
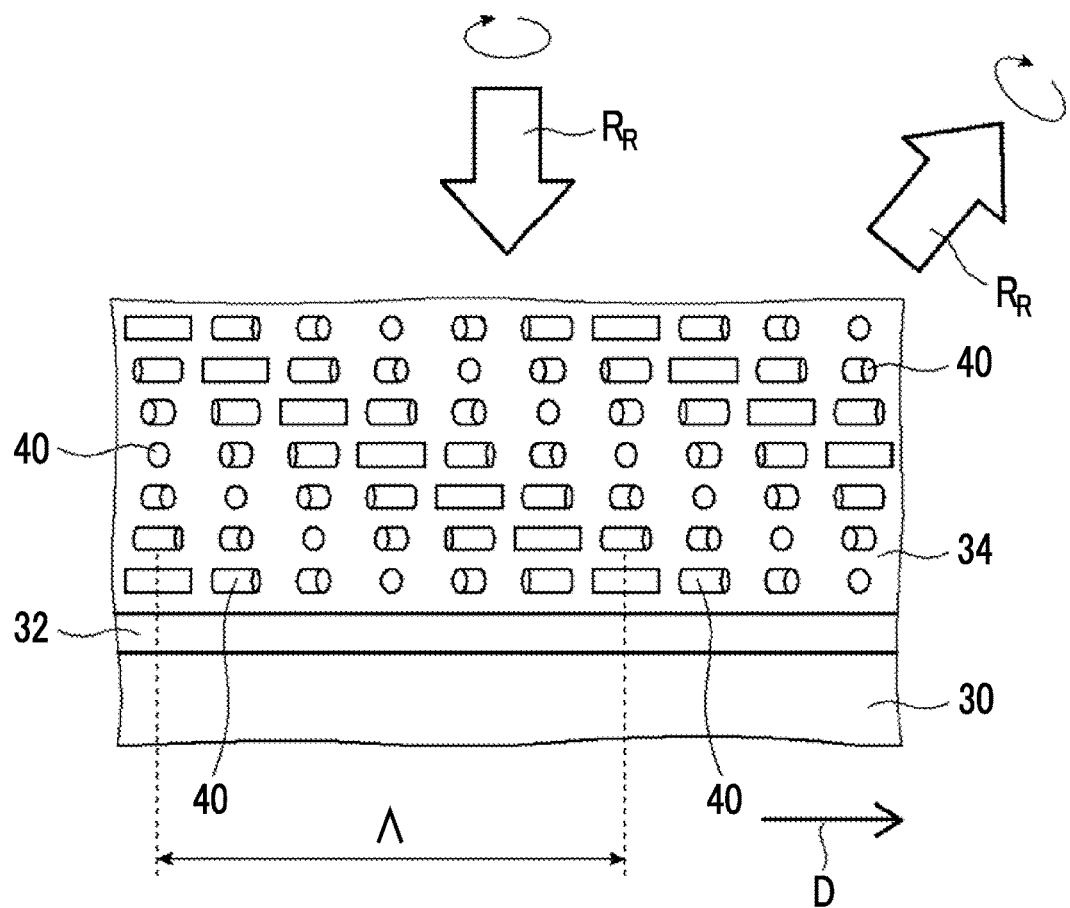
FIG. 10 is a conceptual diagram showing an action of the liquid crystal layer shown in FIG. 7.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 10.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction). The liquid crystal alignment pattern formed in the liquid crystal layer 34 is a pattern that is periodic in the arrangement axis D direction. Therefore, as conceptually shown in FIG. 10, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can e reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

That is, in FIGS. 7 and 8, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer, the length over which the optical axis of the liquid crystal compound rotates by 180° in the liquid crystal alignment pattern of the liquid crystal compound is the single period $\Lambda$ of the diffraction structure, and the one in-plane direction (arrangement axis D direction) in which the optical axis of the liquid crystal compound changes while rotating is the periodic direction of the diffraction structure.

In the liquid crystal layer having the liquid crystal alignment pattern, as the single period $\Lambda$ decreases, the angle of reflected light with respect to the incidence light increases.

That is, as the single period $\Lambda$ decreases, reflected light can be reflected in a state where it is largely tilted with respect to incidence light. Accordingly, the single period of the liquid crystal alignment pattern in the liquid crystal layer of each of the diffraction elements may be appropriately set depending on the diffraction angles, arrangement, and the like of the diffraction elements.

The periods (single periods $\Lambda$) of the diffraction structures of the diffraction elements are preferably 0.1 µm to 10 µm, more preferably 0.1 µm to 1 µm, still more preferably 0.1 µm to 0.8 µm, and still more preferably a wavelength $\lambda$ or less of incident light from the viewpoint of propagating light in the light guide plate 16 by total reflection.

In addition, in the liquid crystal layer of the incidence diffraction element, the liquid crystal layer of the intermediate diffraction element, and the liquid crystal layer of the emission diffraction element that diffract light having the same wavelength, the helically twisted rotation directions of the cholesteric liquid crystalline phases are the same. On the other hand, in the liquid crystal layers that diffract light having the same wavelength, the helically twisted rotation directions of the cholesteric liquid crystalline phases may be the same as or different from each other. That is, for example, as in the example shown in FIG. 6, in a case where two optical members that guide different colors are provided, the helically twisted rotation direction of the liquid crystal layer of the diffraction element in the optical member 13d and the helically twisted rotation direction of the liquid crystal layer of the diffraction element in the optical member 13e may be the same as or different from each other.

Here, the example shown in FIG. 8 shows the configuration in which, on the X-Z plane of the liquid crystal layer 34, the optical axis 40A of the liquid crystal compound 40 is aligned to be parallel to the main surface (X-Y plane). However, the present invention is not limited to this configuration. For example, as shown in FIG. 11, a configuration in which, on the X-Z plane of the liquid crystal layer 34, the optical axes 40A of the liquid crystal compound 40 is aligned to be tilted with respect to the main surface (X-Y plane) may be adopted.

Figure 11:
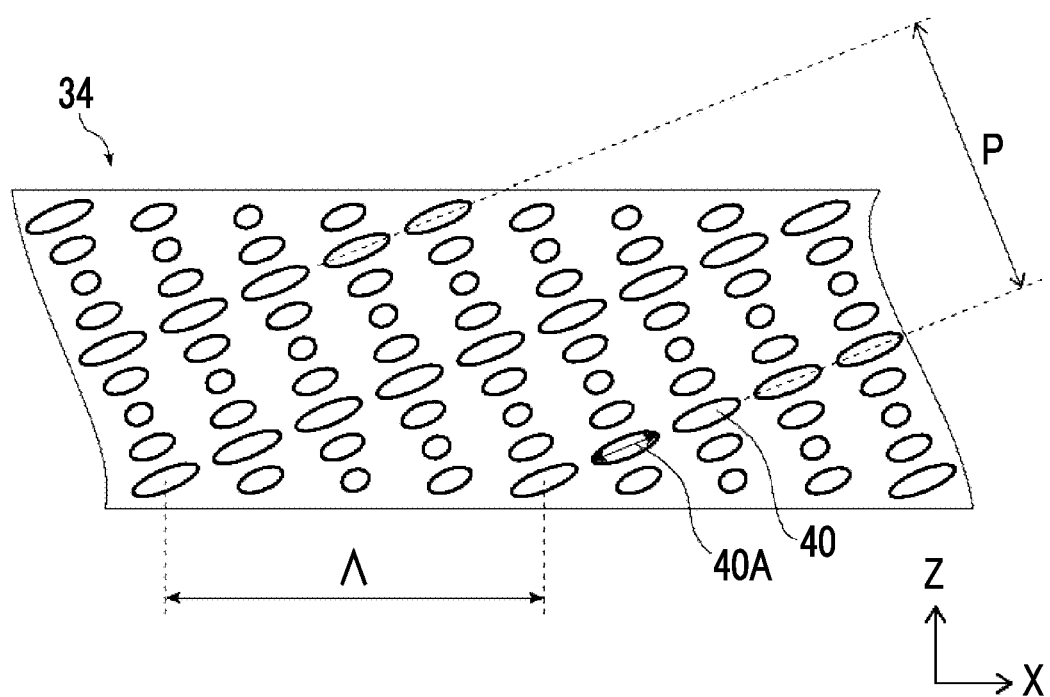
FIG. 11 is a diagram conceptually showing another example of the liquid crystal layer used as a diffraction element.

In addition, the example shown in FIG. 11 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 12:
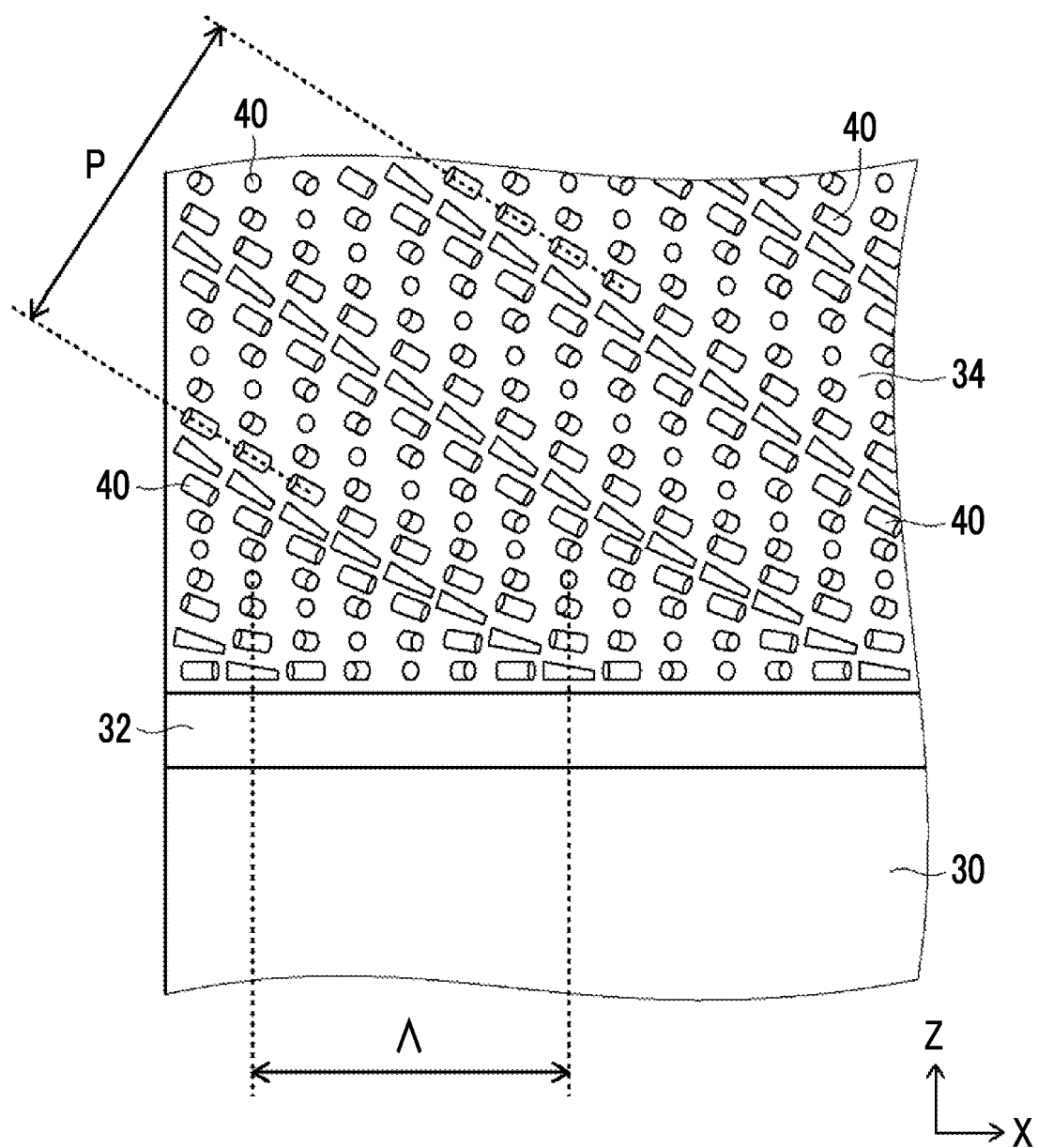
FIG. 12 is a diagram conceptually showing another example of the liquid crystal layer used as a diffraction element.

For example, in an example shown in FIG. 12, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

<<Method of Forming Liquid Crystal Layer>>

The liquid crystal layer can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. These crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystal phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 mJ/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer is not particularly limited, and the thickness with which a required light reflectivity can be obtained may be appropriately set depending on the use of the diffraction element, the light reflectivity required for the liquid crystal layer, the material for forming the liquid crystal layer, and the like.

(Liquid Crystal Diffraction Element B)

In the above-described example, the liquid crystal layer obtained by cholesteric alignment of the liquid crystal compound is used as the liquid crystal diffraction element. Various liquid crystal diffraction elements can be used as the liquid crystal diffraction element used in the present invention as long as they have the liquid crystal alignment pattern in which the optical axis 40A derived from the liquid crystal compound 40 continuously rotates in at least one in-plane direction.

In the present invention, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 14:
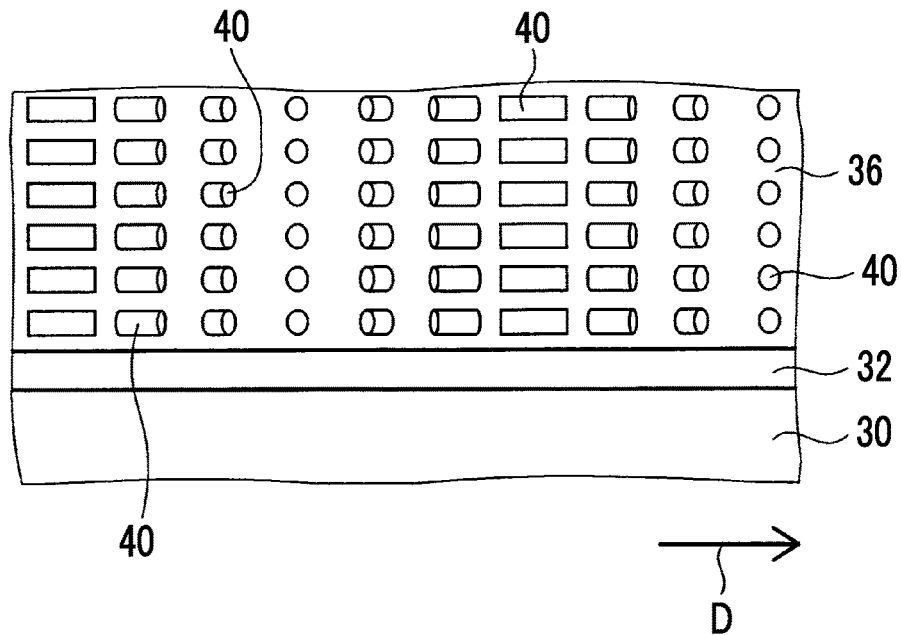
FIG. 14 is a diagram conceptually showing another example of the liquid crystal layer used as a diffraction element.
Figure 15:
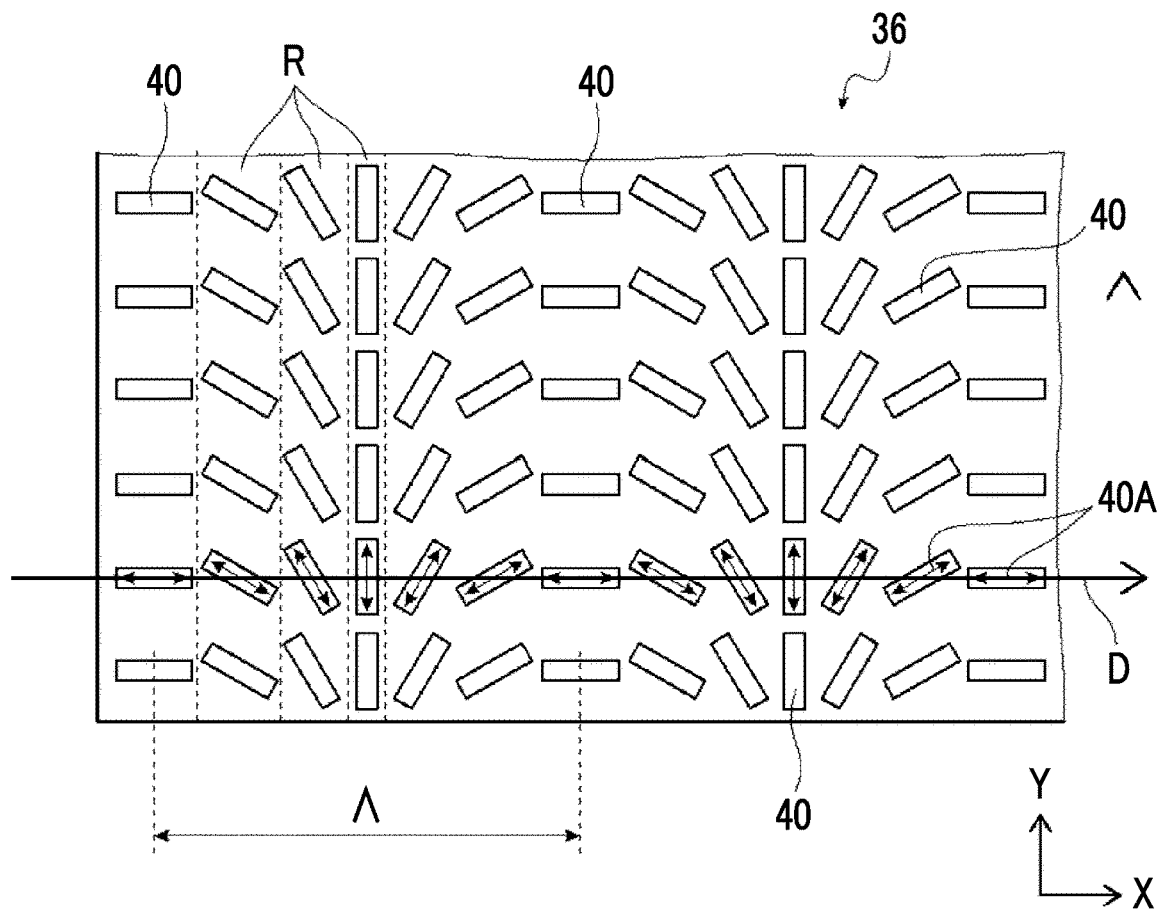
FIG. 15 is a plan view showing the liquid crystal layer shown in FIG. 14.

FIGS. 14 and 15 show an example of another liquid crystal diffraction element.

A liquid crystal diffraction element shown in FIGS. 14 and 15 includes the support 30, the alignment film 32, and a liquid crystal layer 36.

As in the liquid crystal layer 34, the liquid crystal layer 36 of the liquid crystal diffraction element shown in FIG. 15 also has the liquid crystal alignment pattern in which the optical axis 40A of the liquid crystal compound 40 continuously rotates in the arrangement axis D direction. FIG. 15 also shows only the liquid crystal compound of the surface of the alignment film 32 as in FIG. 7.

In the liquid crystal diffraction element shown in FIG. 14, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 36 has the liquid crystal alignment pattern in which the direction of the optical axis 40A derived from the liquid crystal compound 40 changes while continuously rotating in the arrangement axis D direction in a plane, that is, in the one in-plane direction indicated by arrow D.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 16:
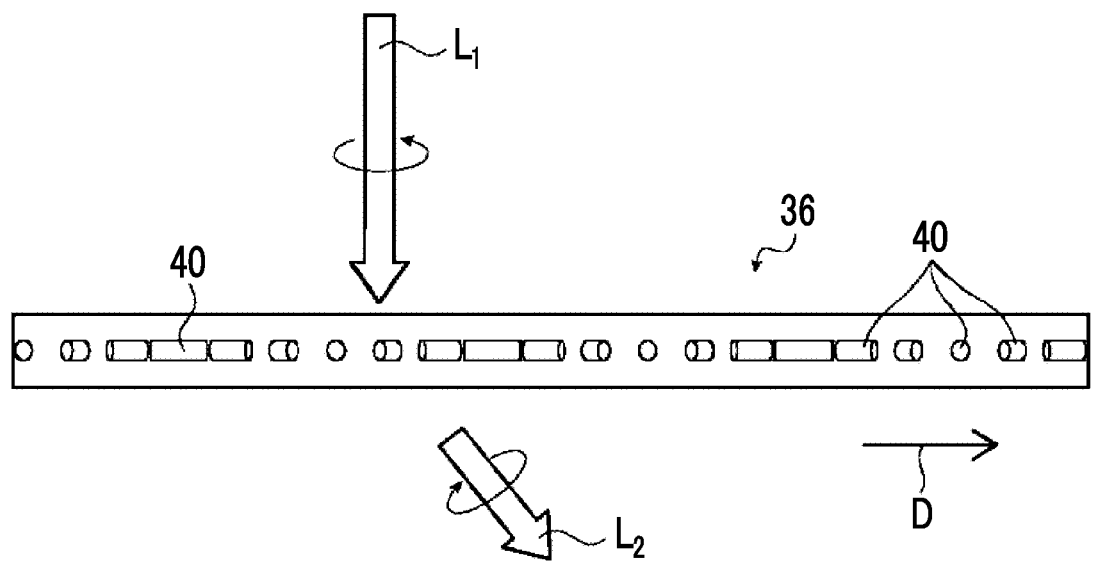
FIG. 16 is a conceptual diagram showing an action of the liquid crystal layer shown in FIG. 14.
Figure 17:
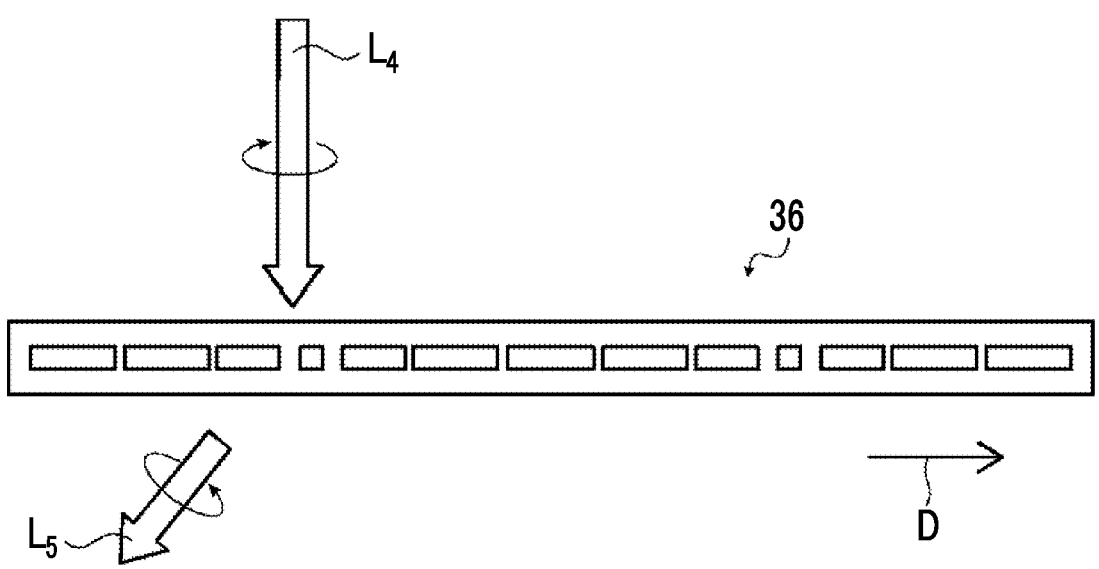
FIG. 17 is a conceptual diagram showing the action of the liquid crystal layer shown in FIG. 14.

This action is conceptually shown in FIGS. 16 and 17. In the liquid crystal layer 36, the value of the product of the difference in refractive index of the liquid crystal compound and the thickness of the optically-anisotropic layer is $\lambda/2$.

As shown in FIG. 16, in a case where the value of the product of the difference in refractive index of the liquid crystal compound in the liquid crystal layer 36 and the thickness of the optically-anisotropic layer is $\lambda/2$ and incidence light $L_1$ as left circularly polarized light is incident into the liquid crystal layer 36, the incidence light $L_1$ transmits through the liquid crystal layer 36 to be imparted with a phase difference of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 17, in a case where the value of the product of the difference in refractive index of the liquid crystal compound in the liquid crystal layer 36 and the thickness of the optically-anisotropic layer is $\lambda/2$ and incidence light $L_4$ of right circularly polarized light is incident into the liquid crystal layer 36, the incidence light $L_4$ transmits through the liquid crystal layer 36 to be imparted with a phase difference of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow X direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 34, by changing the single period Λ of the liquid crystal alignment pattern formed in the liquid crystal layer 36, refraction angles of the transmitted light components $L_2$ and $L_5$ can be adjusted. Specifically, even in the liquid crystal layer 36, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D1 direction, the refraction direction of transmitted light can be reversed. That is, in the example FIGS. 14 to 17, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where total reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In addition, the liquid crystal diffraction element having a region in which the liquid crystal compound is twisted and rotates (the twisted angle is less than 360°) without being cholesterically aligned can also be used as a reflective diffraction element. This liquid crystal diffraction element can also function as a reflective diffraction element in which diffracted light is reflected from an interface with the liquid crystal diffraction element and emitted from the light incidence side to reflect and diffract the light.

In the light guide element according to the embodiment of the present invention, different kinds of diffraction elements may be used in combination as the diffraction elements. For example, a transmissive liquid crystal diffraction element may be used as the incidence diffraction element, and a reflective liquid crystal diffraction element may be used as the intermediate diffraction element and the emission diffraction element.

[Polarization Element]

The polarization element absorbs or reflects at least a part of the light in the polarized state that is selectively diffracted by the emission diffraction element. Accordingly, the polarized light that is absorbed or reflected by the polarization element is appropriately set depending on the configuration of the emission diffraction element.

As the polarization element, a circular polarization plate, an elliptical polarizing plate, or a linear polarizing plate that is well-known in the related art can be used.

As the circular polarization plate or the elliptical polarizing plate, for example, a combination of a retardation plate and a linear polarizer can be used. For example, the circular polarization plate has a configuration in which a λ/4 plate as the retardation plate and a linear polarizer are laminated such that an angle between a slow axis of the λ/4 plate and an absorption axis of the linear polarizer is 45°.

It is preferable that the retardation plate has reverse wavelength dispersibility. As a result, the retardation layer can deal with light in wide wavelength range. The reverse wavelength dispersibility refers to a property in which the absolute value of phase difference increases as the wavelength increases, and forward dispersibility refers to a property in which the absolute value of phase difference increases as the wavelength decreases.

In order to improve visibility for the optical member and the image display apparatus according to the embodiment of the present invention, a diffractive optical method of enlarging an exit pupil may be used.

Specifically, a diffractive optical method of using a plurality of diffraction components (diffraction elements), that is, an optical method of using in-coupling, intermediate and out-coupling diffractive elements can be used. This method is described in detail in JP2008-546020A.

Hereinabove, the light guide element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1-1

<Preparation of Incidence Diffraction Element B>
(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| The following material for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

—Material for Photo-Alignment—

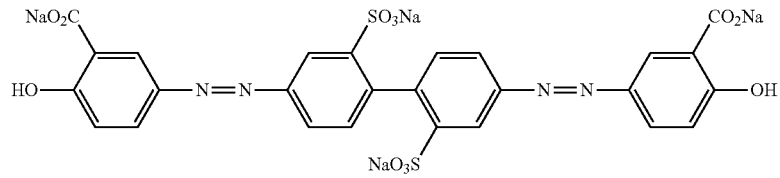

(Exposure of Alignment Film)

The alignment film was exposed using the exposure device shown in FIG. 13 to form an alignment film P-1 having an alignment pattern.

In the exposure device, a laser that emits laser light having a wavelength (325 nm) was used as the laser. The exposure amount of the interference light was 1000 $mJ/cm^2$. The single period (the length over which the optical axis rotates by 180°) of an alignment pattern formed by interference of two laser beams was controlled by changing an intersecting angle (intersecting angle α) between the two beams.

(Formation of Liquid Crystal Layer)

As the liquid crystal composition forming the incidence diffraction element B, the following composition A-1 was prepared. This composition A-1 is a liquid crystal composition forming a cholesteric liquid crystal layer (cholesteric liquid crystalline phase) that reflects right circularly polarized light.

Composition A-1

| Rod-like liquid crystal compound L-1 | 100.00 parts by mass |
|---|---|
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 6.10 parts by mass |
| Methyl ethyl ketone | 204.00 parts by mass |

Rod-Like Liquid Crystal Compound L-1

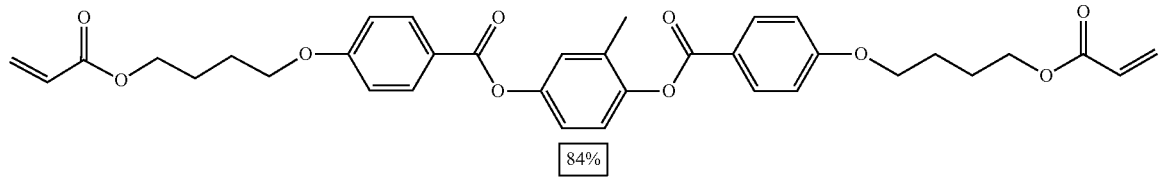

84%

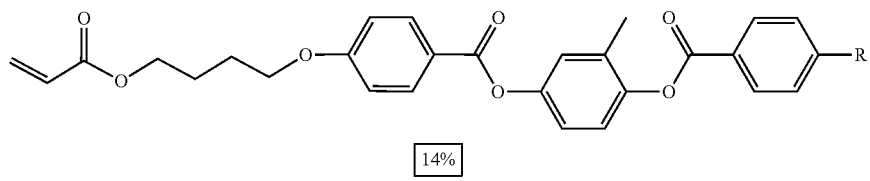

14%

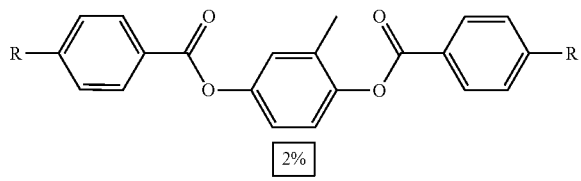

2%

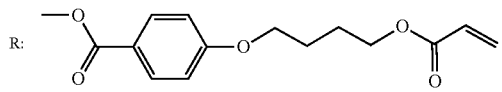

Chiral Agent Ch-1

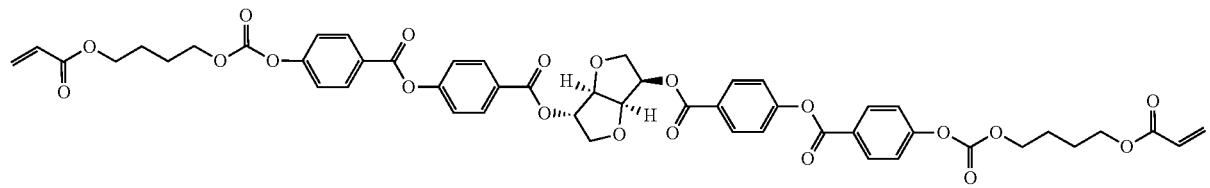 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

The above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm² using a high-pressure mercury lamp in a nitrogen atmosphere. As a result, the alignment of the liquid crystal compound is immobilized, and the liquid crystal layer of the incidence diffraction element B was formed.

In a case where a cross-section of a coating layer was observed with a scanning electron microscope (SEM), the number of pitches of the normal direction (thickness direction) with respect to the main surface was 8. In addition, the pitch P of tilted surfaces of bright portions and dark portions with respect to a main surface was 0.31 μm. The bright portions and the dark portions described herein refer to bright portions and dark portions derived from a cholesteric liquid crystalline phase in a case where a cross-section of the cholesteric liquid crystal layer was observed with a SEM.

It was verified using a polarization microscope that the liquid crystal layer of the incidence diffraction element B had a periodically aligned surface as shown in FIG. 7. In a case where a cross-section of the coating layer was observed with a SEM, in the liquid crystal alignment pattern of the liquid crystal layer of the incidence diffraction element B, the single period Λ over which the optical axis of the liquid crystal compound rotated by 180° was 0.32 μm.

(Preparation of Emission Diffraction Element B)
An emission diffraction element B was prepared using the same method as that of the incidence diffraction element B, except that the film thickness was adjusted.
The number of pitches in the liquid crystal layer was 2.
(Preparation of λ/4 Plate)
(Formation of Alignment Film)
An alignment film was formed using the same method as that of Example 1.
(Exposure of Alignment Film)
By irradiating the obtained alignment film P-Q1 with polarized ultraviolet light (50 mJ/cm², using an extra high pressure mercury lamp), the alignment film P-Q1 was exposed.
(Formation of λ/4 Plate)
As the liquid crystal composition forming the λ/4 plate, the following composition C-1 was prepared.
Composition C-1

| | |
|---|---|
| Liquid crystal compound L-2 | 42.00 parts by mass |
| Liquid crystal compound L-3 | 42.00 parts by mass |
| Liquid crystal compound L-4 | 16.00 parts by mass |
| Polymerization initiator PI-1 | 0.50 parts by mass |
| Leveling agent G-1 | 0.20 parts by mass |
| Methyl ethyl ketone | 176.00 parts by mass |
| Cyclopentanone | 44.00 parts by mass |

—Liquid Crystal Compound L-2—

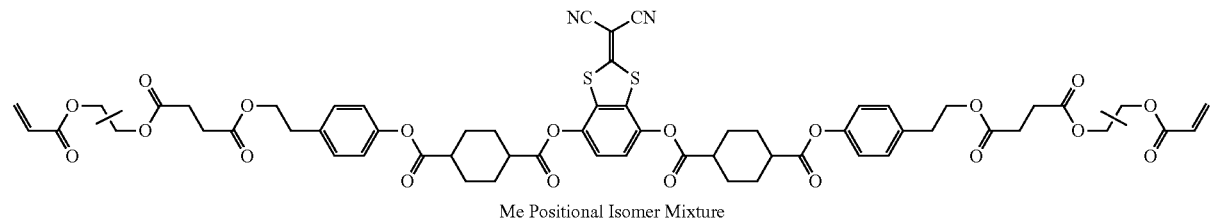

Me Positional Isomer Mixture

—Liquid Crystal Compound L-3—

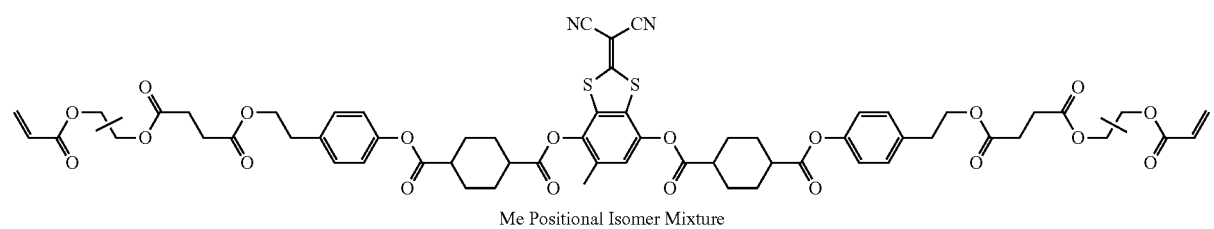

Me Positional Isomer Mixture

—Liquid Crystal Compound L-4—

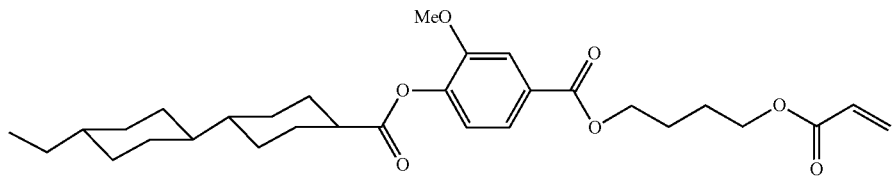 [SMILES: C=CC(=O)OCCCCOC(=O)c1ccc(OC(=O)C2CCC(C3CCC(CC)CC3)CC2)c(OC)c1]

—Polymerization Initiator PI-1—

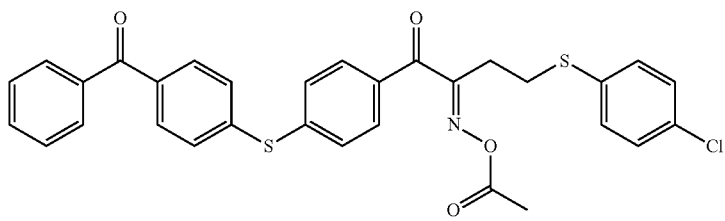 [SMILES: CC(=O)O/N=C(\CCSc1ccc(Cl)cc1)C(=O)c1ccc(Sc2ccc(C(=O)c3ccccc3)cc2)cc1]

—Leveling Agent G-1—

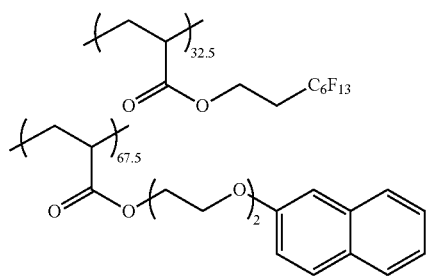

As the λ/4 plate, a layer formed of a reverse dispersion liquid crystal compound was formed.

The λ/4 plate was formed by applying the following composition C-1 to the alignment film P-Q1. The applied coating film was heated using a hot plate at 70° C., the coating film was cooled to 65° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized.

As a result, a λ/4 plate was obtained. Re(530) of the obtained λ/4 plate was 133 nm.

(Preparation of Polarization Element)

The λ/4 plate prepared as described above and a linear polarizer were bonded to each other using an adhesive layer in a state where directions thereof were adjusted. As a result, a circular polarization plate was prepared and was used as a polarization element.

(Preparation of Light Guide Element)

As the light guide plate, a glass (material) light guide plate formed of glass and having a size of 60 mm×70 mm and a thickness of 1 mm was used.

The incidence diffraction element B was cut into a size having a diameter of 6 mm and used. The emission diffraction element B was cut into a size of 20 mm×25 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using an adhesive.

Each of the diffraction elements was disposed as shown in FIG. 1. The incidence diffraction element B and the emission diffraction element B were disposed to be spaced from each other by 8 mm in the left-right direction.

As a result, a light guide element was prepared.

(Preparation of Optical Member)

At a position overlapping the emission diffraction element in the plane direction, the polarization element was disposed to be spaced on a side of the prepared light guide element opposite to the light guide plate. As a result, an optical member was prepared.

The polarization element was cut into a size of 20 mm×25 mm and used. The distance between the light guide element and the polarization element was 2 mm.

Example 1-2

An optical member was prepared using the same method as that of Example 1-1, except that the polarization element and the light guide element were disposed in contact with each other.

Example 1-3

An optical member was prepared using the same method as that of Example 1-1, except that a linear polarizer was used as the polarization element.

Comparative Example 1

An optical member was prepared using the same method as that of Example 1-1, except that it did not include the polarization element.

Examples 2-1 to 2-3 and Comparative Example 2

Optical members were prepared using the same methods as Examples 1-1 to 1-3 and Comparative Example 1, respectively, except that the following incidence diffraction element G was used instead of the incidence diffraction element B and the following emission diffraction element G was used instead of the emission diffraction element B.

(Preparation of Incidence Diffraction Element G)

The incidence diffraction element B was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.27 parts by mass, and the film thickness was adjusted.

In the liquid crystal layer of the incidence diffraction element G, the number of pitches in the thickness direction was 8, and in the liquid crystal alignment pattern, the single period Λ over which the optical axis derived from the liquid crystal compound rotated by 180° was 0.39 μm. The pitch P of the liquid crystal layer was 0.36 μm.

(Preparation of Emission Diffraction Element G)

An emission diffraction element G was prepared using the same method as that of the incidence diffraction element G, except that the film thickness was adjusted.

The number of pitches in the liquid crystal layer was 2.

Examples 3-1 to 3-3 and Comparative Example 3

Optical members were prepared using the same methods as Examples 1-1 to 1-3 and Comparative Example 1, respectively, except that the following incidence diffraction element R was used instead of the incidence diffraction element B and the following emission diffraction element R was used instead of the emission diffraction element B.

(Preparation of Incidence Diffraction Element R)

The incidence diffraction element R was prepared using the same method as that of the incidence diffraction element B, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.42 parts by mass, and the film thickness was adjusted.

In the liquid crystal layer of the incidence diffraction element R, the number of pitches in the thickness direction was 8, and in the liquid crystal alignment pattern, the single period Λ over which the optical axis derived from the liquid crystal compound rotated by 180° was 0.45 μm. The pitch P of the liquid crystal layer was 0.43 μm.

(Preparation of Emission Diffraction Element R)

The emission diffraction element R was prepared using the same method as that of the incidence diffraction element R, except that the film thickness was adjusted.

The number of pitches in the liquid crystal layer was 2.

Example 4-1

(Preparation of Intermediate Diffraction Element B)

An intermediate diffraction element B was prepared using the same method as that of the incidence diffraction element B, except that the amount of the chiral agent in the composition for forming the liquid crystal layer was changed to 5.57 parts by mass during the exposure of the alignment film and the film thickness was adjusted.

The number of pitches in the liquid crystal layer of the intermediate diffraction element B in the thickness direction was two, and the pitch P of the liquid crystal layer was 0.34 μm. In addition, in the liquid crystal alignment pattern, the single period Λ over which the optical axis derived from the liquid crystal compound rotated by 180° was 0.23 μm.

(Preparation of Light Guide Element)

As the light guide plate, a glass (material) light guide plate formed of glass and having a size of 60 mm×70 mm and a thickness of 1 mm was used.

The incidence diffraction element B was cut into a size having a diameter of 6 mm and used. The intermediate diffraction element B was cut into a size of 15 mm (maximum)×25 mm and used. The emission diffraction element B was cut into a size of 20 mm×25 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using an adhesive.

Each of the diffraction elements was disposed as shown in FIG. 3. The intermediate diffraction element B and the incidence diffraction element B were disposed to be spaced from each other by 1 mm in the left-right direction. In addition, the emission diffraction element B and the intermediate diffraction element B were disposed to be spaced from each other by 8 mm in the up-down direction.

As a result, a light guide element was prepared.

(Preparation of Optical Member)

At a position overlapping the emission diffraction element in the plane direction, the polarization element was disposed to be spaced on a side of the prepared light guide element opposite to the light guide plate. As a result, an optical member was prepared.

The polarization element was cut into a size of 20 mm×25 mm and used. The distance between the light guide element and the polarization element was 2 mm.

Example 4-2

An optical member was prepared using the same method as that of Example 4-1, except that the polarization element and the light guide element were disposed in contact with each other.

Example 4-3

An optical member was prepared using the same method as that of Example 4-1, except that a linear polarizer was used as the polarization element.

Comparative Example 4

An optical member was prepared using the same method as that of Example 4-1, except that it did not include the polarization element.

Examples 5-1 to 5-3 and Comparative Example 5

Optical members were prepared using the same methods as Examples 4-1 to 4-3 and Comparative Example 4, respectively, except that the incidence diffraction element G was used instead of the incidence diffraction element B, the following intermediate diffraction element G was used instead of the intermediate diffraction element B, and the emission diffraction element G was used instead of the emission diffraction element B.

(Preparation of Intermediate Diffraction Element G)

An intermediate diffraction element G was prepared using the same method as that of the incidence diffraction element G, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.64 parts by mass, and the film thickness was adjusted.

In the liquid crystal layer, the number of pitches in the thickness direction was 2, and in the liquid crystal alignment pattern, the single period Λ over which the optical axis derived from the liquid crystal compound rotated by 180° was 0.28 μm. The pitch P of the liquid crystal layer was 0.41 μm.

Examples 6-1 to 6-3 and Comparative Example 6

Optical members were prepared using the same methods as Examples 4-1 to 4-3 and Comparative Example 4, respectively, except that the incidence diffraction element R was used instead of the incidence diffraction element B, the following intermediate diffraction element R was used instead of the intermediate diffraction element B, and the emission diffraction element R was used instead of the emission diffraction element B.

(Preparation of Intermediate Diffraction Element R)

An intermediate diffraction element R was prepared using the same method as that of the incidence diffraction element R, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 3.94 parts by mass, and the film thickness was adjusted.

In the liquid crystal layer, the number of pitches in the thickness direction was 2, and in the liquid crystal alignment pattern, the single period Λ over which the optical axis derived from the liquid crystal compound rotated by 180° was 0.32 μm. The pitch P of the liquid crystal layer was 0.48 μm.

[Evaluation]

Regarding each of the prepared light guide elements, stray light and the brightness of the displayed image were evaluated using the following methods. In Examples 1-1 to 1-3 and 4-1 to 4-3 and Comparative Examples 1 and 4, the evaluation was performed using light having a wavelength of 450 nm. In Examples 2-1 to 2-3 and 5-1 to 5-3 and Comparative Examples 2 and 5, the evaluation was performed using light having a wavelength of 532 nm. In Examples 3-1 to 3-3 and 6-1 to 6-3 and Comparative Examples 3 and 6, the evaluation was performed using light having a wavelength of 635 nm.

(Stray Light)

A projection display in which a projection light source and a convex lens were combined with liquid crystal on silicon (LCOS) was prepared. An image display apparatus was prepared in which a projection display was disposed to emit an image to the incidence diffraction element. A circular polarization plate was disposed between the projection display and the incidence diffraction element such that an image of right circularly polarized light was projected to the incidence diffraction element. Each of the projection displays emitted an image of a color (wavelength) corresponding to the incidence diffraction element.

An image was displayed using the prepared image display apparatus, and stray light was evaluated based on the following standards.

A: The occurrence of stray light was negligible

B: the occurrence of stray light was weakly visually recognized but the degree thereof was within the allowable range C: the occurrence of stray light was visually recognized and conspicuous (Brightness of Display Image)

Light emitted from the light source was caused to transmit through the linear polarizer and the λ/4 plate. As a result, circularly polarized light was obtained. This light was caused to be incident into the incidence diffraction element of the light guide element and was emitted from the emission diffraction elements. In this case, the amount of the emitted light was measured using a power meter. The emitted light was measured at measurement positions including a position at a distance of 10 mm from an upper end of the emission diffraction element, a position at the center in the left-right direction, and positions at a distance of ±6 mm from the center in the left-right direction. In addition, in a case where the normal direction to the main surface of the light guide plate was represented by 0°, the incidence angle of light into the incidence diffraction elements was changed on a basis of 10° from 0° to 20°. A pinhole was disposed such that the effective aperture of the power meter was 2 mmφ, the light amount was measured for the evaluation such that the emitted light transmitted through the center of the pinhole, and the amount of light as the average value of the measured values at the positions and the incidence angles was evaluated.

A: the amount of light was 80% or more with respect to that of the corresponding comparative example B: the amount of light was less than 80% with respect to that of the corresponding comparative example The results are shown in Tables 1 and 2 below.

TABLE 1

| | Incidence Diffraction Element Period of Diffraction Structure [μm] | Emission Diffraction Element Period of Diffraction Structure [μm] | Polarization Element λ/4 Plate | Polarization Element Polarizer | Distance from Light Guide Element | Evaluation Stray Light | Evaluation Brightness of Display Image |
|---|---|---|---|---|---|---|---|
| Comparative example 1 | 0.32 | 0.32 | Not Provided | Not Provided | — | C | A |
| Example1-1 | 0.32 | 0.32 | Provided | Provided | Distant | A | A |
| Example1-2 | 0.32 | 0.32 | Provided | Provided | Contact | A | B |
| Example1-3 | 0.32 | 0.32 | Not Provided | Provided | Distant | B | A |
| Comparative example 2 | 0.39 | 0.39 | Not Provided | Not Provided | — | C | A |
| Example2-1 | 0.39 | 0.39 | Provided | Provided | Distant | A | A |
| Example2-2 | 0.39 | 0.39 | Provided | Provided | Contact | A | B |
| Example2-3 | 0.39 | 0.39 | Not Provided | Provided | Distant | B | A |
| Comparative example 3 | 0.45 | 0.45 | Not Provided | Not Provided | — | C | A |
| Example3-1 | 0.45 | 0.45 | Provided | Provided | Distant | A | A |
| Example3-2 | 0.45 | 0.45 | Provided | Provided | Contact | A | B |
| Example3-3 | 0.45 | 0.45 | Not Provided | Provided | Distant | B | A |

TABLE 2

| | Incidence Diffraction Element Period of Diffraction Structure [μm] | Intermediate Diffraction Element Period of Diffraction Structure [μm] | Emission Diffraction Element Period of Diffraction Structure [μm] | Polarization Element λ/4 Plate | Polarization Element Polarizer | Distance from Light Guide Element | Evaluation Stray Light | Evaluation Brightness of Display Image |
|---|---|---|---|---|---|---|---|---|
| Comparative example 4 | 0.32 | 0.23 | 0.32 | Not Provided | Not Provided | — | C | A |
| Example4-1 | 0.32 | 0.23 | 0.32 | Provided | Provided | Distant | A | A |
| Example4-2 | 0.32 | 0.23 | 0.32 | Provided | Provided | Contact | A | B |
| Example4-3 | 0.32 | 0.23 | 0.32 | Not Provided | Provided | Distant | B | A |
| Comparative example 5 | 0.39 | 0.28 | 0.39 | Not Provided | Not Provided | — | C | A |
| Example5-1 | 0.39 | 0.28 | 0.39 | Provided | Provided | Distant | A | A |
| Example5-2 | 0.39 | 0.28 | 0.39 | Provided | Provided | Contact | A | B |
| Example5-3 | 0.39 | 0.28 | 0.39 | Not Provided | Provided | Distant | B | A |
| Comparative example 6 | 0.45 | 0.32 | 0.45 | Not Provided | Not Provided | — | C | A |
| Example6-1 | 0.45 | 0.32 | 0.45 | Provided | Provided | Distant | A | |
| Example6-2 | 0.45 | 0.32 | 0.45 | Provided | Provided | Contact | A | B |
| Example6-3 | 0.45 | 0.32 | 0.45 | Not Provided | Provided | Distant | B | A |

It can be seen from Tables 1 and 2 that, in Examples 1-1 to 6-3 of the present invention, stray light can be suppressed as compared to Comparative Examples corresponding thereto.

In addition, it can be seen from a comparison between Examples 1-1 and 1-2, a comparison between Examples 2-1 and 2-2, a comparison between Examples 3-1 and 3-2, a comparison between Examples 4-1 and 4-2, a comparison between Examples 5-1 and 5-2, and a comparison between Examples 6-1 and 6-2 that a decrease in the brightness of the display image can be suppressed by disposing the polarization element to be spaced from the light guide element.

In addition, it can be seen from a comparison between Examples 1-1 and 1-3, a comparison between Examples 2-1 and 2-3, a comparison between Examples 3-1 and 3-3, a comparison between Examples 4-1 and 4-3, a comparison between Examples 5-1 and 5-3, and a comparison between Examples 6-1 and 6-3 that stray light can be more suitably suppressed by using the circular polarization plate consisting of the retardation layer and the linear polarizer as the polarization element.

As can be seen from the above results, the effects of the present invention are obvious.

The present invention is suitably applicable to various optical devices such as AR glasses in which light guiding is used.

EXPLANATION OF REFERENCES 10, 10b to 10d: image display apparatus
12: display element
14, 14a to 14e: light guide element
16, 16d to 16e: light guide plate
18, 18c to 18e: incidence diffraction element
20: intermediate diffraction element
24, 24c to 24e: emission diffraction element
30: support
32: alignment film
34, 36: liquid crystal layer
40: liquid crystal compound
40A: optical axis
42: bright portion
44: dark portion
60: exposure device
62: laser
64: light source
65: $\lambda/2$ plate
68: polarization beam splitter
70a, 70B: mirror
72A, 72B: $\lambda/4$ plate
$R_R$: right circularly polarized light of red light
M: laser light
MA, MB: beam
$P_O$: linearly polarized light
$P_R$: right circularly polarized light
$P_L$: left circularly polarized light
α: intersecting angle
Q: absolute phase
E, E1, E2: equiphase surface
U: user
D: arrangement axis
Λ: single period
P: pitch

What is claimed is:

1. An optical member comprising:
a light guide element including a light guide plate and an incidence diffraction element and an emission diffraction element that are disposed on a main surface of the light guide plate; and
a polarization element that blocks transmission of light leaking to a side of the emission diffraction element opposite to an emission side,
wherein the emission diffraction element is a polarization diffraction element,
the polarization element is disposed on the side of the emission diffraction element opposite to the emission side,
the polarization element is disposed at a position overlapping the emission diffraction element in a plane direction of the main surface of the light guide plate, and
the polarization element absorbs or reflects light in one polarized state and allows transmission of light in other polarized states.

2. The optical member according to claim 1,
wherein the emission diffraction element is a reflective diffraction element, and
the polarization element is disposed on a side of the emission diffraction element opposite to the light guide plate side.

3. The optical member according to claim 1,
wherein the polarization element is spaced from the light guide element.

4. The optical member according to claim 1,
wherein the polarization element is an elliptical polarizing plate.

5. The optical member according to claim 1,
wherein the polarization element is a circular polarization plate.

6. The optical member according to claim 1,
wherein the polarization element consists of a linear polarizer and a retardation plate.

7. The optical member according to claim 6,
wherein the retardation plate is a $\lambda/4$ plate.

8. The optical member according to claim 6,
wherein the retardation plate has reverse wavelength dispersibility.

9. The optical member according to claim 1,
wherein the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

10. The optical member according to claim 9,
wherein the liquid crystal diffraction element has a region in which the direction of the optical axis of the liquid crystal compound is helically twisted and rotates in a thickness direction.

11. The optical member according to claim 9,
wherein the liquid crystal diffraction element includes a cholesteric liquid crystal layer obtained by immobilizing a cholesteric liquid crystalline phase.

12. The optical member according to claim 1,
wherein a period of a diffraction structure of the polarization diffraction element is 0.1 μm or more and 10 μm or less.

13. An image display apparatus comprising:
the optical member according to claim 1; and
a display element that emits an image to the incidence diffraction element of the optical member.

14. The optical member according to claim 2,
wherein the polarization element is spaced from the light guide element.

15. The optical member according to claim 2,
wherein the polarization element is an elliptical polarizing plate.

16. The optical member according to claim 2,
wherein the polarization element is a circular polarization plate.

17. The optical member according to claim 2,
wherein the polarization element consists of a linear polarizer and a retardation plate.

18. The optical member according to claim 17,
wherein the retardation plate is a $\lambda/4$ plate.

19. The optical member according to claim 7,
wherein the retardation plate has reverse wavelength dispersibility.

20. The optical member according to claim 2,
wherein the polarization diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

21. An optical member comprising:
a light guide element including a light guide plate and an incidence diffraction element and an emission diffraction element that are disposed on a main surface of the light guide plate; and
a polarization element that blocks transmission of light leaking to a side of the emission diffraction element opposite to an emission side,
wherein the emission diffraction element is a polarization diffraction element,
the polarization element is disposed on the side of the emission diffraction element opposite to the emission side,
the polarization element is disposed at a position overlapping the emission diffraction element in a plane direction of the main surface of the light guide plate, and
the polarization element absorbs or reflects light in a polarized state that is selectively diffracted by the emission diffraction element.

* * * * *